(12) United States Patent
Ling et al.

(10) Patent No.: US 10,516,444 B2
(45) Date of Patent: Dec. 24, 2019

(54) METHOD AND SYSTEM FOR PROVIDING AN ANTENNA THAT IS OPTIMIZED FOR NEAR-FIELD-COMMUNICATION (NFC) AND REDUCES THE EFFECT OF FAR-FIELD-COMMUNICATION (FFC)

(71) Applicant: MaxLinear, Inc., Carlsbad, CA (US)

(72) Inventors: Curtis Ling, Carlsbad, CA (US); Paul P. Chominski, San Diego, CA (US)

(73) Assignee: MAXLINEAR, INC., Carlsbad, CA (US)

( * ) Notice: Subject to any disclaimer, the term of this patent is extended or adjusted under 35 U.S.C. 154(b) by 58 days.

(21) Appl. No.: 15/815,410

(22) Filed: Nov. 16, 2017

(65) Prior Publication Data

US 2018/0167106 A1  Jun. 14, 2018

Related U.S. Application Data

(63) Continuation of application No. 13/857,805, filed on Apr. 5, 2013, now Pat. No. 9,825,671.

(60) Provisional application No. 61/620,727, filed on Apr. 5, 2012.

(51) Int. Cl.
   *H04B 5/00* (2006.01)
   *H04B 5/02* (2006.01)

(52) U.S. Cl.
   CPC .......... *H04B 5/00* (2013.01); *H04B 5/0031* (2013.01); *H04B 5/0081* (2013.01); *H04B 5/0093* (2013.01); *H04B 5/02* (2013.01)

(58) Field of Classification Search
   CPC combination set(s) only.
   See application file for complete search history.

(56) References Cited

U.S. PATENT DOCUMENTS

| | | |
|---|---|---|
| 2003/0058502 A1 | 3/2003 | Griffiths et al. |
| 2004/0208591 A1 | 10/2004 | Willebrand et al. |
| 2006/0238304 A1 | 10/2006 | Loving |
| 2006/0238305 A1 | 10/2006 | Loving et al. |
| 2006/0252391 A1 | 11/2006 | Poilasne |
| 2007/0256105 A1* | 11/2007 | Tabe ............... G08B 13/19697 725/78 |
| 2007/0292138 A1* | 12/2007 | Echols ................ H04B 10/801 398/116 |
| 2008/0060024 A1* | 3/2008 | Decanne ............... H04H 20/61 725/72 |

(Continued)

*Primary Examiner* — Ganiyu A Hanidu
(74) *Attorney, Agent, or Firm* — McAndrews, Held & Malloy, Ltd.

(57) ABSTRACT

Methods and systems are provided for aligning devices separated by physical barriers. A first electronic device may be paired with a second electronic device, with the first electronic device and the second electronic device being on opposite sides of a physical barrier. Wireless communication of signals between the first electronic device and the second electronic device may then be configured to nullify or reduce signals in areas other than a region within the barrier between a signal transmission component of the first electronic device and a signal reception component of the second electronic device. Feedback for enabling aligning the first electronic device with the second electronic device may be provided, such as to user of one or both of the first electronic device and the second electronic device. Providing the feedback may include generating visual and/or audio cues to enable the aligning.

28 Claims, 13 Drawing Sheets

(56) References Cited

U.S. PATENT DOCUMENTS

| | | | |
|---|---|---|---|
| 2012/0206309 A1* | 8/2012 | Lavedas | H01Q 1/2216 343/742 |
| 2012/0297426 A1* | 11/2012 | Ling | H04N 21/43615 725/68 |
| 2013/0201316 A1* | 8/2013 | Binder | H04L 67/12 348/77 |
| 2014/0269871 A1* | 9/2014 | Huynh | H04B 1/38 375/224 |

* cited by examiner

METHOD AND SYSTEM FOR PROVIDING AN ANTENNA THAT IS OPTIMIZED FOR NEAR-FIELD-COMMUNICATION (NFC) AND REDUCES THE EFFECT OF FAR-FIELD-COMMUNICATION (FFC)

CLAIM OF PRIORITY AND CROSS-REFERENCE TO RELATED APPLICATIONS/INCORPORATION BY REFERENCE

This patent application is a continuation of U.S. patent application Ser. No. 13/857,805, filed on Apr. 5, 2013, which in turn makes reference to, claims priority to, and claims benefit from U.S. Provisional Patent Application Ser. No. 61/620,727, filed on Apr. 5, 2012.

This patent application also makes reference to:
U.S. application Ser. No. 13/687,676, entitled "Method and System for Monitoring, Management and Maintenance of an Internet Protocol LNB," which was filed on Nov. 28, 2012;
U.S. application Ser. No. 13/723,897, entitled "Method and System for Broadband Near Field Communication Utilizing Full Spectrum Capture," which was filed on Dec. 21, 2012;
U.S. application Ser. No. 13/726,965, entitled "Method and System for Broadband Near-field Communication (BNC) Utilizing Full Spectrum Capture (FSC) Supporting Bridging Across Walls," which was filed on Dec. 26, 2012; and
U.S. application Ser. No. 13/726,994, entitled "Method and System for Broadband Near-field Communication (BNC) Utilizing Full Spectrum Capture (FSC) Supporting Concurrent Charging and Communication," which was filed on Dec. 26, 2012.

Each of the above reference applications is hereby incorporated herein by reference in its entirety.

FIELD OF THE INVENTION

Certain embodiments of the invention relate to communication systems. More specifically, certain embodiments of the invention relate to a method and system for providing an antenna that is optimized for near-field-communication (NFC) and reduces the effect of far-field-communication (FFC).

BACKGROUND OF THE INVENTION

Near-Field Communication (NFC) is a new short-range, standards-based wireless connectivity technology that uses magnetic field induction to enable communication between electronic devices in close proximity. Based on radio frequency identification (RFID) technologies, NFC provides a medium for the identification protocols that validate secure data transfer. NFC enables users to perform intuitive, safe, contactless transactions, access digital content and connect electronic devices simply by touching or bringing devices into close proximity.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for providing an antenna that is optimized for near-field-communication (NFC) and reduces the effect of far-field-communication (FFC), substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1:
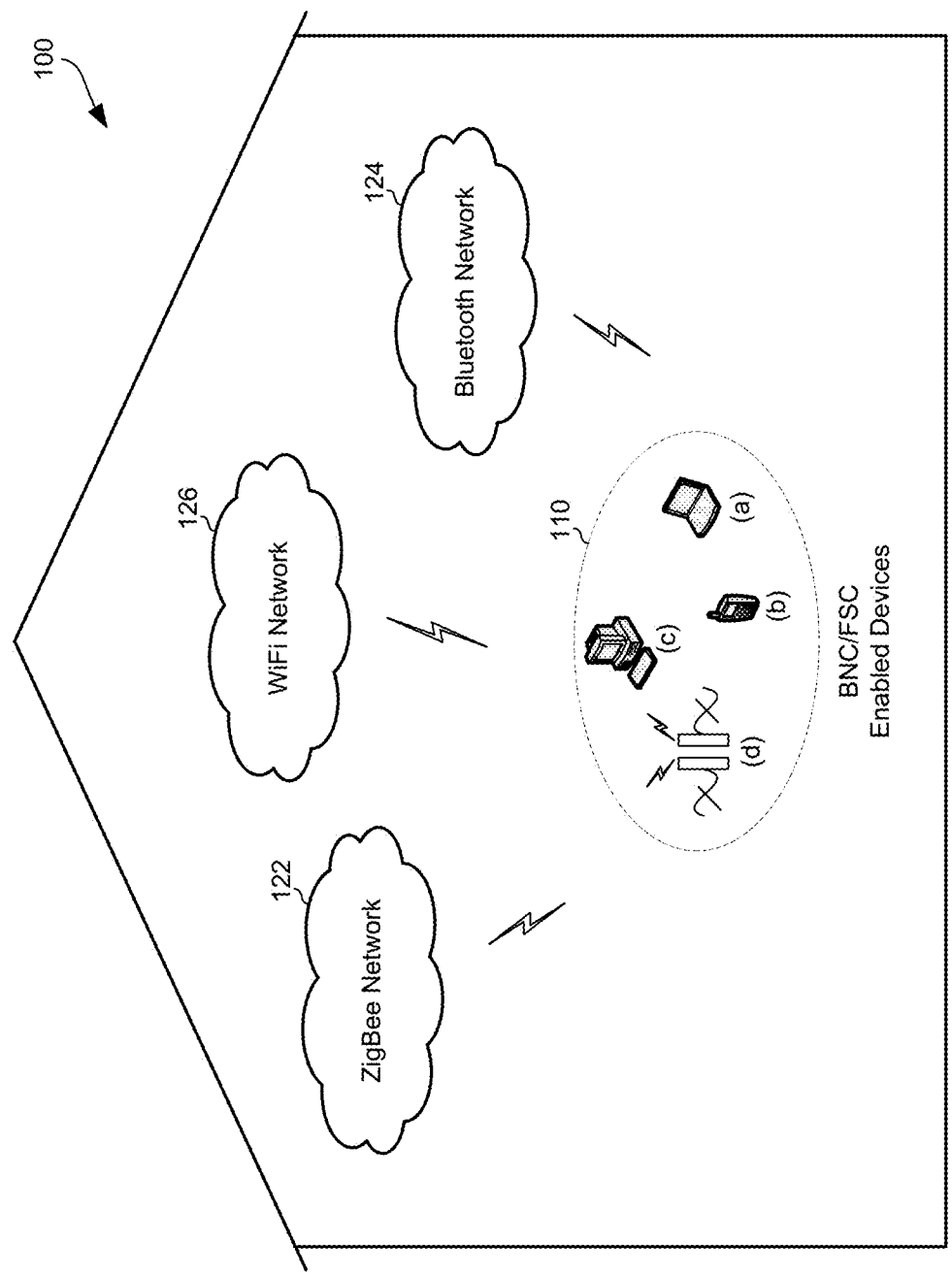
FIG. 1 is a diagram that illustrates an example communication system, such as a broadband near-field communication (BNC) system that utilizes full spectrum capture (FSC), in accordance with an example embodiment of the invention.

As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Certain embodiments of the invention may be found in a method and system for providing an antenna that is optimized for near-field-communication (NFC) and reduces the effect of far-field-communication (FFC). In accordance with various embodiments of the invention, a communication system may comprise a first broadband device and a second broadband device. Signals may be communicated from the first broadband device to the second broadband device at a power level that is below a spurious emissions mask, over a designated frequency band. The signals may be wirelessly communicated from the first broadband device to the second broadband device across a barrier that separates the first broadband device from the second broadband device. In this regard, to support the wireless communication of the signals across the barrier, a signal transmission component of the first broadband device and a signal reception component of the second broadband device are jointly configured to nullify or reduce signals in areas other than a region between the components. Each of the signal transmission component of the first broadband device and the signal reception component of the second broadband device comprise one or more antennas or coils. In this regard, the antennas or coils of each of the signal transmission component of the first broadband device and the signal reception component of the second broadband device may be configured and/or used to nullify or reduce the signals in the areas other than the region between the components, such as by optimizing electromagnetic fields in the region between the antennas or coils of the signal transmission component of the first broadband device and the antennas or coils of the signal reception component of the second broadband device and nullifying electromagnetic field in other regions. The electromagnetic fields between the antennas or coils of the signal transmission component of the first broadband device and the antennas or coils of the signal reception component of the second broadband device may be configured to reinforce each other (the fields) to create a near field effect. The first broadband device may be paired with the second broadband device. Usable channels may be detected within a frequency spectrum band designated for use by the first and the second broadband device.

FIG. 1 is a diagram that illustrates an example broadband near-field communication (BNC) system that utilizes full spectrum capture (FSC), in accordance with an example embodiment of the invention. Referring to FIG. 1, there is shown a communication system 100 comprising a plurality of devices 110(a) through 110(d), and associated communication networks 122 through 126. The communication system 100 may be, for example, a BNC system and the devices 110(a) through 110(d) may be, for example, BNC/FSC enabled.

A BNC/FSC enabled device such as the BNC/FSC enabled device 110(a) may comprise suitable logic, circuitry, code, and/or interfaces that may be operable to perform broadband near-field communication (BNC) with other BNC/FSC enabled devices. In this regard, the BNC/FSC enabled device 110(a) may exchange or communicate various types of information such as, for example, telephone numbers, pictures, multimedia content and files such as MP3 files, and/or digital authorizations with other BNC/FSC enabled devices such as the BNC/FSC enabled devices 110(b) and 110(c). In one example embodiment of the invention, the BNC/FSC dongle 110(d) may enable wireless communication across a barrier such as a dwelling wall.

For data transmission with BNC, a BNC enabled device that initiates the data transmission refers to a polling device (initiator), while a BNC enabled device that is targeted by the polling device refers to a listening device. A BNC enabled device such as the BNC/FSC enabled device 110(a) may operate in a reader/writer mode (active mode), a card emulation mode (passive mode), or a peer-to-peer mode. In active mode, the BNC/FSC enabled device 110(a) is active and reads or writes to a passive legacy RFID tag. In passive mode, the BNC/FSC enabled device 110(a) behaves like an existing contactless card conforming to one of the legacy standards. In peer-to-peer mode, the BNC/FSC enabled device 110(a) and its peer BNC enabled device such as the BNC/FSC enabled device 110(b) may exchange or communicate information. In this regard, the initiator device (polling device) may require less power compared to the reader/writer mode. Depending on device capacities, the BNC/FSC enabled devices 110(a)-110(d) may coexist with or support other wireless technologies such as, for example, ZigBee, Bluetooth, WLAN, and WiMAX. In this regard, the BNC/FSC enabled devices 110(b) and 110(c) may operate in various spectrum bands. For example, with ZigBee enabled, the BNC/FSC enabled devices 110(a)-110(c) may operate in 868 MHz, 915 MHz or 2.4 GHz frequency bands. With Bluetooth enabled, the BNC/FSC enabled devices 110(b), 110(c) and 110(d) may operate within the 2.4 GHz band. With WLAN enabled, the BNC/FSC enabled devices 110(b), 110(c) and 110(d) may operate within the 2.4, 3.6 and 5 GHz frequency bands. With fixed WiMAX enabled, the BNC/FSC enabled devices 110(b), 110(c) and 110(d) may operate in the 2.5 GHz and 3.5 GHz frequency bands, which require a license, as well as the license-free 5.8 GHz band. With mobile WiMAX enabled, the BNC/FSC enabled devices 110(b), 110(c) and 110(d) may operate in the 2.3-2.4 GHz, 2.5-2.7 GHz, 3.3-3.4 GHz and 3.4-3.8 GHz frequency bands.

In an example embodiment of the invention, the BNC/FSC enabled device 110(a) may be operable to utilize full-spectrum capture (FSC) technology to meet the challenging demands of operators, consumers, and hardware vendors while providing efficient scalability for future development. In this regard, the BNC/FSC enabled device 110(a) may be operable to digitize all, or substantially all, of the spectrum covered by the protocol(s) of interest, such that all, or substantially all, channels of the protocol(s) are concurrently digitized and available for further processing The BNC/FSC enabled device 110(a) may utilize BNC together with full spectrum capture to provide BNC/FSC hybrid solutions for proliferating data or content delivery and services throughout the home and to connected devices such as the BNC/FSC enabled devices 110(b), 110(c) and 110(d). Aspects of full spectrum capture may be found in U.S. application Ser. No. 13/485,003 filed May 31, 2012, U.S. application Ser. No. 13/336,451 filed on Dec. 23, 2011 and U.S. Application 61/532,098 filed Sep. 7, 2011. Each of these applications is hereby incorporated herein by reference in its entirety. In accordance with an example embodiment of the invention, the BNC/FSC dongle 110(d) may provide wireless bridging across a barrier such as walls or other obstructions within a building.

The ZigBee network 122 may comprise suitable logic, circuitry, code, and/or interfaces that may be operable to provide data services to various ZigBee-based devices such as the BNC/FSC enabled devices 110(a), 110(c) and 110(d) using ZigBee technology. ZigBee is a standard that defines a set of communication protocols on top of the IEEE 802.15.4 Radio Protocol for low-data-rate short-range wireless networking. For example, the ZigBee network 122 may incorporate ZigBee radios to operate at 1 mW RF power and to go to sleep when not involved in transmission so as to minimize power consumption and promote long battery life in battery-powered devices.

The Bluetooth network 124 may comprise suitable logic, circuitry, interfaces and/or code that may be operable to provide data services to various Bluetooth-based mobile devices such as the BNC/FSC enabled devices 110a, 110(b), 110(c) and/or 110(d) using Bluetooth technology. A Bluetooth-based mobile device such as the BNC/FSC enabled device 110a may be operable to communicate Bluetooth radio frequency signals with peer Bluetooth devices such as the BNC/FSC enabled devices 110(b), 110(c) and 110(d) for various data services such as SMS/MMS and mobile TV.

The WiFi network 126 may comprise suitable logic, devices, interfaces and/or code that may be operable to provide data services to various mobile devices such as the BNC/FSC enabled devices 110(a), 110(c) and 110(d) by using WiFi technology. A WiFi-based mobile device such as the BNC/FSC enabled device 110a may be operable to communicate WiFi radio frequency signals with peer WiFi devices such as the BNC/FSC enabled devices 110(b), 110(c) and 110(d) for various data services such as SMS/MMS and mobile TV.

In operation, the BNC/FSC devices 110(a), 110(c), and 110(d) may provide BNC/FSC hybrid solutions for signal or data transmission at power densities through associated communication networks such as the Bluetooth network 124. To support the data transmission with BNC, the BNC/FSC enabled devices 110(a), 110(c) and 110(d) may be configured to utilize full spectrum capture in order to detect usable channels and aggregate the usable channels to increase channel bandwidth for the data transmission. In one example embodiment of the invention, for transmission, the data transmission may be carried or transmitted over a single channel within the operating spectrum band. However, for reception, multiple reference elements or signals such as pilot signals may be utilized to determine or detect which of channels in the operating spectrum band may be indeed usable.

Figure 2A:
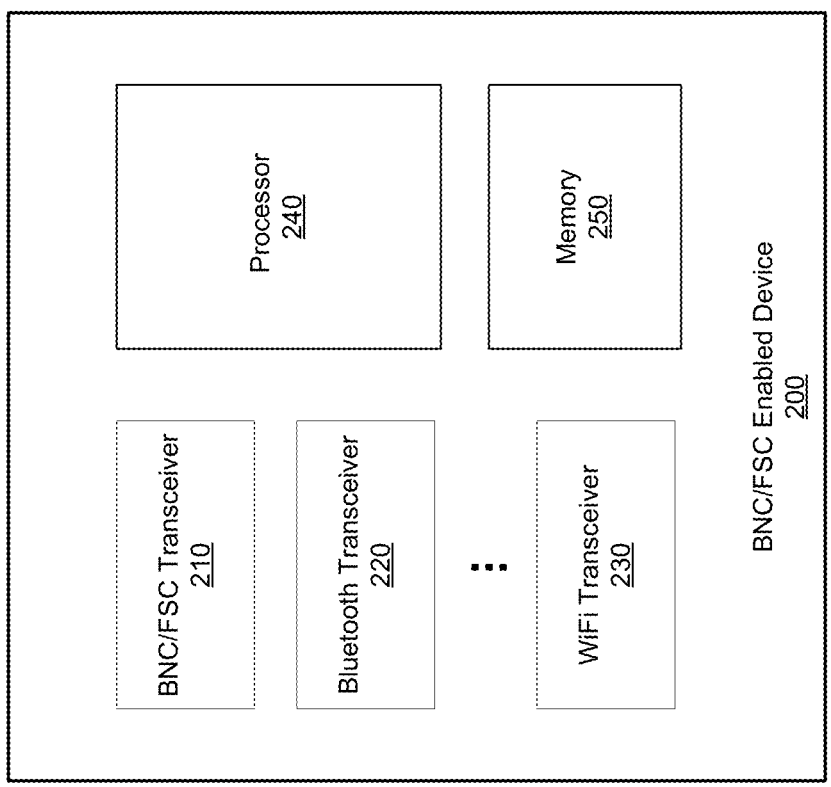
FIG. 2A is a block diagram that illustrates an example device that performs, for example, broadband near-field communication (BNC) utilizing full spectrum capture (FSC), in accordance with an example embodiment of the invention.
Figure 2B:
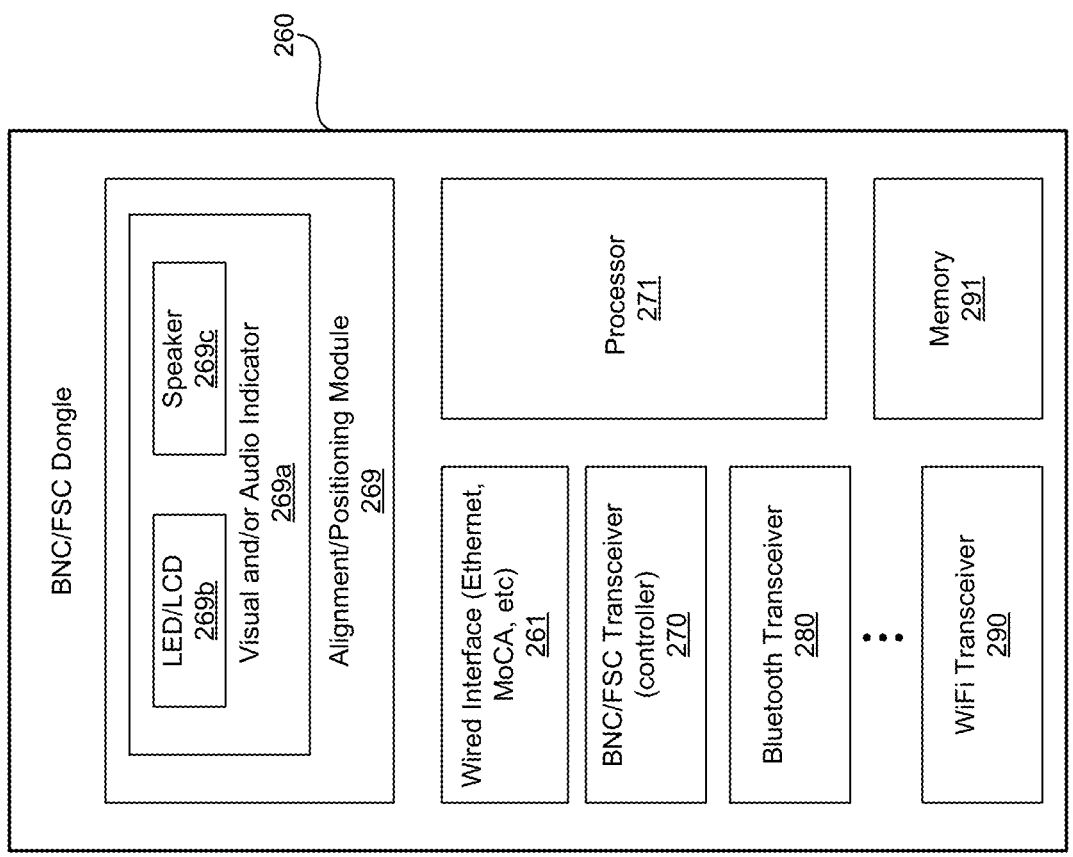
FIG. 2B is a block diagram that illustrates an example Communication utilizing a full spectrum capture dongle, in accordance with an example embodiment of the invention.

FIG. 2A is a block diagram that illustrates an example device that performs, for example, broadband near-field communication (BNC) utilizing full spectrum capture (FSC), in accordance with an example embodiment of the invention. Referring to FIG. 2A, there is shown a device 200 comprising a transceiver 210, a Bluetooth transceiver 220, a WiFi transceiver 230, a processor 240, and a memory 250. The Bluetooth transceiver 220 and the WiFi transceiver 230 may be optional depending on device capabilities, network availabilities and/or user preferences. In accordance with an example embodiment of the invention, device 200 may comprise a BNC/FSC dongle and the transceiver may be a BNC/FSC transceiver 210. FIG. 2B illustrates an example dongle.

The BNC/FSC transceiver 210 may comprise suitable logic, circuitry, interfaces and/or code that may allow the BNC/FSC enabled device 200 and other BNC capable devices to perform communication according to an BNC protocol. The BNC/FSC transceiver 210 may operate in a reader/writer mode (active mode), a card emulation mode (passive mode), or a peer-to-peer mode. In active mode, the BNC/FSC transceiver 210 may act like contactless cards. In this regard, the BNC/FSC transceiver 210 may enable the BNC/FSC enabled device 200 being used for payment. In passive mode, the BNC/FSC transceiver 210 may enable interacting with RF tags. For example, the BNC/FSC transceiver 210 may enable the BNC/FSC enabled device 200 used to read 'Smart Posters' (writer RF tags) to see whatever information has been included. In peer-to-peer mode, the BNC/FSC transceiver 210 may be operable to communicate with another BNC capable devices. For example, the BNC/FSC transceiver 210 may enable the BNC/FSC enabled device 200 to communicate information with other BNC/FSC enabled devices 110(a)-110(c). In an example embodiment of the invention, the BNC/FSC transceiver 210 may utilize a dedicated RF front-end circuitry for data transmission and receiving using BNC. In another example embodiment of the invention, the BNC/FSC transceiver 210 may share a RF front-end circuitry with other technology-based transceivers such as the Bluetooth transceiver 220 and the WiFi transceiver 230. In yet another example embodiment of the invention, the BNC/FSC transceiver 210 may be configured to communicate signals or data in BNC utilizing full spectrum capture. In this regard, the BNC/FSC transceiver 210 may be allowed to capture or utilize the entire spectrum band for data or signal transmission and receiving. For transmission, the BNC/FSC transceiver 210 may be instructed or signaled to utilize a single channel within the spectrum band. For reception, the BNC 210 may be configured to utilize one or more channels within the entire spectrum band.

The Bluetooth transceiver 220 may comprise suitable logic, circuitry, interfaces and/or code that may be operable to communicate Bluetooth radio signals over the Bluetooth network 124. In an example embodiment of the invention, the Bluetooth transceiver 220 may be on continuously when needed and may utilize more power than full spectrum capture. The Bluetooth transceiver 220 may be enabled to support coexistence operations so as to receive Bluetooth signals while utilizing full spectrum capture in the BNC/FSC enabled device 200. In an example embodiment of the invention, the Bluetooth transceiver 220 may utilize a dedicated RF front-end circuitry for data transmission and receiving using Bluetooth. In another example embodiment of the invention, the Bluetooth transceiver 220 may share a RF front-end circuitry with the BNC/FSC transceiver 210 for data transmission and receiving using Bluetooth. In an example embodiment of the invention, in some instances, the Bluetooth transceiver 220 may be securely paired with other Bluetooth and BNC capable devices utilizing BNC. In this regard, the BNC/FSC transceiver 210 may be enabled to exchange authentication information over an BNC link for pairing the Bluetooth transceiver 220 with other Bluetooth and BNC capable devices.

The WiFi transceiver 230 may comprise suitable logic, circuitry, interfaces and/or code that may be operable to communicate WiFi radio signals over the WiFi network 126. In an example embodiment of the invention, the WiFi transceiver 230 may be on continuously when needed and may utilize more power than full spectrum capture. The WiFi transceiver 230 may be enabled to support coexistence operations so as to receive WiFi signals while utilizing full spectrum capture in the BNC/FSC enabled device 200. In an example embodiment of the invention, the WiFi transceiver 230 may utilize a dedicated RF front-end circuitry for data transmission and reception using WiFi. In another example embodiment of the invention, the WiFi transceiver 230 may share a RF front-end circuitry with the BNC/FSC transceiver 210 for data transmission and receiving using WiFi.

The processor 240 may comprise suitable logic, circuitry, interfaces and/or code that may be enabled to perform a variety of signal processing tasks such as channel selection or filtering, digital scaling, rate conversion, carrier/time synchronization/recovery, equalization/demapping, and/or channel decoding. The processor 240 may support various modem operations such as OFDM and CDMA operations. The processor 240 may be operable to coordinate and control operations of the BNC/FSC transceiver 210, the Bluetooth transceiver 220, and the WiFi transceiver 230 to communicate corresponding radio signals while utilizing full spectrum capture. For example, the processor 240 may manage, activate or deactivate the BNC/FSC transceiver 210 according to received Bluetooth signals via the Bluetooth transceiver 220. The processor 240 may also be operable to synchronize the operation of the BNC/FSC transceiver 210 and the Bluetooth transceiver 220, for example, so as to reduce time delay for accurately determining the location of an object of interest. In an example embodiment of the invention, the processor 240 may be operable to manage data transmission as well as data reception. For transmission, the processor 240 may be operable to select or utilize a single channel within the operation spectrum band for data transmission. For reception, the processor 240 may be operable to utilize multiple reference elements or signals such as pilot signals to determine or detect which of the channels in the operation spectrum band may be indeed usable. The processor 240 may also be operable to aggregate the usable channels to increase channel bandwidth for the data transmission.

In various example embodiments of the invention, the processor 240 may enable configuration of the BNC/FSC enabled device 200 to operate in different communication environments. In this regard, for example, power, distance and bandwidth may be configured in order to stay within the FCC masks and limits and at the same time, provide optimal performance across the entire bandwidth.

For FCC requirements, power may be measured in a 120 KHz spectrum bandwidth. To determine how much power could be transmitted, the bandwidth available has to be determined. Once the bandwidth is determined, that value may be divided by 120 KHz and the results multiplied by the power that may be transmitted. For example, within the broadcast television frequency band, spurious radiation within a 120 kHz bandwidth must result in field strength of 200 microvolts per meter or less, measured at a distance of 3 meters from an isotropic radiator. This field strength equates to a transmitted power of 0.01 microwatts (−50 dBm) of power radiating isotropically. If a bandwidth much larger than 120 kHz is utilized, the FCC requirements imply that much more power may be transmitted without transgressing limits on spurious emissions. For example, if a devices transmits its power over a 100 MHz bandwidth, then dividing this 100 MHz bandwidth by the measurement bandwidth of 120 KHz results in a 29 dB increase in allowable spurious emission levels. In order to stay well within the FCC limitations for spurious emissions, a device may be designed to transmit −50 dBm spread over a full gigahertz (GHz) of bandwidth, which is 39 dB below the FCC spurious radiation power spectral density limitations. With such a conservative estimate, the FCC may not possibly complain and consumer product manufacturers may have no issues or have any questions about whether the product may pass the FCC regulation.

Although −50 dBm may seem like very little power, using full spectrum capture may enable a wealth of applications. At this power level, several bits per second per hertz may be reliably conveyed across a distance of about 10 cm, equating to several gigabits per second of capacity if the entire television spectrum up to 1 GHz is employed. If the −50 dBm transmitted power is spread over a subset of the television spectrum (e.g., 200 to 600 MHz), there is a low likelihood of interference with any device 3 meters or farther away.

When broadband near-field communication is employed at a distance less than a wavelength, then attenuation improves nonlinearly as distance decreases linearly.

The processor 240 may establish a high data rate communication link utilizing BNC which transmits power levels 30 dB or more below spurious emission levels permitted by FCC, while maintaining a link budget with sufficient margin to address a variety of use cases, trading off data rate for transmission distance or barrier penetrating capabilities. One method of implementing this tradeoff is to use spread spectrum techniques to achieve spreading gain in exchange for throughput, such as is employed in CDMA systems. With a 30 dB margin, signals may, for example, be communicated through a typical non-load-bearing concrete wall.

In an example embodiment of the invention, the processor 240 may enable the use of a channel or spectrum map to dynamically track in real-time, what frequencies in the channel band are usable. For example, the environment may be sensed and a channel map may be generated to identify TV, Bluetooth, WiMAX, and 802.11 channels and the status of the identified channels noted. The channels that are not currently usable, for example above a certain noise threshold, will be avoided. The channel map is dynamically updated. In an example embodiment of the invention, a broadband OFDM receiver may be utilized to capture the entire band and selectively begin to transmit on those channels that are deemed suitable (e.g., based on the channel map) for transmission. Since the two devices (Tx and Rx) are relatively close to each other, it may be safe to assume that both devices (Tx and Rx) are experiencing similar RF related conditions. In this regard, the transmitter may transmit without coordination of frequencies between the two devices. In one example embodiment of the invention, a pool of backup channels may be maintained and as soon as a current channel degrades, a switch may be made to utilize the backup channels. Channels may be allocated from the pool of backup channels and de-allocated and placed back in the pool as needed. In an example embodiment of the invention, in instances where the BNC/FSC enabled device 200 may coexist with an 802.11 device, the BNC/FSC enabled device 200 may be operable to sense the channel and transmit only on channels that are determined to be clear. The channel map may be continuously updated to ensure that the status of each of the channels is up-to-date. A weighting may also be applied to the channel.

In one example embodiment of the invention, a plurality of users, each with their own spreading code, may concurrently transmit over a large bandwidth without any blocking. A receiver may capture the entire bandwidth and based on security settings, may select and listen to only those authorized user signals that may be of interest.

In one example embodiment of the invention, the processor 240 may enable broadcast feature based distance. For example, the characteristics of a room such as the size and openness may be sensed and the power, data rate, and range for the BNC/FSC enabled device 200 may be adjusted to conform with the sensed characteristics. The BNC/FSC enabled device 200 may be configured to communicate based on some threshold distance that is sensed. In some instances, it may be desirable for all conference participants in a conference room to receive information for a presentation. In this regard, the presenter does not care who receives a broadcast signal of the presentation so long as they are within a certain range, in this case, in the room. For example, all the conference participants may be within a perimeter of 15 feet. The broadcast is therefore controlled so that the content for the presentation is broadcasted to the conference participants within the conference room. In addition, beamforming and MIMO may be employed to determine the characteristics and to optimize communication amongst the devices.

In one example embodiment of the invention, the processor 240 may provide or enable security by turning down the transmit power of the BNC/FSC enabled device 200 in order to minimize eavesdropping. In such instances, the containment of the power enables only devices within a certain range to receive signals and devices that are outside that range will not be able to receive signals. A lookup table (LUT), for example, comprising power and distance or range data may be utilized by the processor 240 or other device within the BNC/FSC enabled device 200 to control this security feature.

In another example embodiment of the invention, the processor 240 may provide or enable security by ensuring that the processing time is less than the round trip delay in order to prevent spoofing. In this regard, the processor 240 or other device within the BNC/FSC enabled device 200 may be operable to determine the round trip delay. If the determined round trip delay is less than or equal to a certain value or threshold, communication may be permitted. However, in instances where the round trip delay may be greater than a particular value or threshold, communication may be blocked since this may be an indication that spoofing may have occurred.

In an example embodiment of the invention, a conference presenter may walk into a conference room and provide information such as the size of the room and the number of participants. This information may be utilized by the processor 240 to control the power and range that may be utilized to configure the BNC/FSC transceiver for use during the conference or other group presentations. In this manner, device screens and files, for example, may be shared amongst conference or group participant devices.

In another aspect of the invention, a map of conference attendees in the room may be presented and the conference may manually authorize each attendee to receive BNC/FSC presented information.

In various example embodiments of the invention, the processor 240 may enable sharing of a screen for a cell phone or other communication device with other people in a room. While applications such as WebEx are tied to the Web, various example embodiments of the instant invention comprise ad-hoc sharing of content, and control and manipulation of content displayed on a screen. In this regard, there is no need for a sophisticated backend server to facilitate the Web sharing service.

In an example embodiment of the invention, a conference presenter may utilize BNC/FSC to share the information displayed on their tablet or cell phone screen with all team members in a conference room, either directly or in a daisy-chain manner. In this regard, the content displayed on the presenter's desktop on the cell phone or a tablet will be displayed on the screens of team members in an ad-hoc manner.

In an example embodiment of the invention, a user may decide to take a picture and instead of showing it to a friend and emailing or texting the picture to that friend, the user may decide to share the screen that displays the picture content. Unlike Webex or other screen sharing methods, the processor 240 may enable sharing of the screens on a smartphone or tablet without using the 3G network or Internet. Additionally, no wires need to be connected for sharing of content among devices.

In an example embodiment of the invention, the processor 240 may manage content for the BNC/FSC enabled device 200 such that the content may be layered and when a user is within certain proximity of another BNC/FSC device, the display may be shared without the need for any security. Both devices may concurrently display the same content. A profile may be utilized to determine what is to be shared and with whom it should be shared and when. A profile may also indicate other criteria such as time of day and location where sharing of the screen is permissible. Once the profile or some default settings are established, then the sharing of the display may occur automatically without user intervention.

Since the BNC/FSC enabled device 200 may be a Location Aware and Context Aware device, the processor 240 may be configured to determine whether the environment is a friendly one and if so, no security may be utilized. On the other hand, if it determined that the environment is unfriendly, then security may be required before screens are shared. If the user is with family or friends, then the screen may be shared without security with devices that are within a certain range. For devices outside of that range, then security is required to share the screen. A secure sharing session may be initiated with any device with the proper security keys (public keys and private keys) or procedures in place. A user may initiate sharing of their screen with all devices within 10 feet without security. This may occur since there is enough bandwidth to resolve the distance to within a foot or less. The distance may be extended if the user thinks that only trusted devices will be within that extended range. In some instances, the user may only allow a certain number of devices to share the screen. Once that number is reached, then no more connections or sharing sessions are permitted. If another device attempts to view the displayed screen, then that attempt is denied. This may be referred to as proximity sharing. With proximity sharing, the processor 240 may or may not place restriction on whether the screen or file may be copied and/or edited. For example, in instances where a file of a memo is being shared, group editing may be enabled for some or all the members in the group. Members in the group may be given control of the document at different times to enable editing. This may also be utilized on a social environment. For example, one user may draw on their device screen and the drawing on that screen is shared among friends in the room. The friends may interact with the drawing and may edit the document so it becomes a conversational piece.

In addition to sharing screens, videos, presentations, the processor 240 may allow that files may also be shared in an ad-hoc manner without the need to use the WWAN cellular network or a WiFi network, thereby eliminating the need to utilize and cause congestion on these networks. The cellular service providers may embrace this since it may offload traffic from their networks. This autonomous sharing requires no configuration on the part of the users.

The memory 250 may comprise suitable logic, circuitry, interfaces and/or code that may enable storage of data and/or other information utilized by the processor 240. For example, the memory 250 may be utilized to store information such as available operation spectrum bands that the BNC/FSC enabled device 200 may operate, and channels in the available operation spectrum bands. The memory 250 may be enabled to store executable instructions to manage or configure the BNC/FSC transceiver 210, the Bluetooth transceiver 220, and/or the WiFi transceiver 230 for desired behavior. The memory 250 may comprise RAM, ROM, low latency nonvolatile memory such as flash memory and/or other suitable electronic data storage capable of storing data and instructions.

In operation, the processor 240 may manage and control operation of device components such as the BNC/FSC transceiver 210 and the Bluetooth transceiver 220 to communicate corresponding radio signals for applications of interest. Transceivers such as the BNC/FSC transceiver 210 may be enabled to utilize full spectrum capture for data communication to support the applications of interest. For example, a transceiver such as the BNC/FSC transceiver 210 may be enabled to digitize the entire operation spectrum band, 1 GHz, for example, for instant access to channels anywhere in the operation spectrum band. In this regard, the use of full spectrum capture may enable the BNC/FSC transceiver 210 with total bandwidth deployment flexibility. For example, transceivers such as the BNC/FSC transceiver 210 may be tuned to an entirely different frequency in the operation spectrum band without constraint. In particular, previously unusable frequencies in the operation spectrum band may now be applied for additional broadband services. Additionally, the BNC/FSC transceiver 210 may be tuned to either broadband or broadcast services, and the channel allocation may be changed over time allowing operators to seamlessly transition services from broadcast to IP.

FIG. 2B is a block diagram that illustrates an example device that performs Communication utilizing a full spectrum capture dongle, in accordance with an example embodiment of the invention. In accordance with an example embodiment, the dongle shown is a BNC/FSC dongle. Referring to FIG. 2B, there is shown a BNC/FSC dongle 260 comprising an alignment/positioning module 269, a BNC/FSC transceiver (controller) 270, a wired interface 261, a Bluetooth transceiver 280, a WiFi transceiver 290, a processor 271, and a memory 291. The alignment/positioning module 269 may comprise a visual and/or audio indicator module 269(*a*). The Bluetooth transceiver 280, wired interface 261, and the WiFi transceiver 290 may be optional depending on device capabilities, network availabilities and/or user preferences.

The BNC/FSC transceiver (controller) 270 may comprise suitable logic, circuitry, interfaces and/or code that may allow the BNC/FSC dongle 260 and other BNC capable devices such as the BNC/FSC enabled device 200 to perform communication utilizing BNC/FSC. The BNC/FSC transceiver 270 may be substantially similar to the BNC/FSC transceiver (controller) 210, which is described with respect to FIG. 2A. For example, the BNC/FSC transceiver 270 may enable the BNC/FSC dongle 260 to communicate information with the BNC/FSC enabled device 200 and other BNC/FSC enabled devices 110(*a*)-110(*c*).

The alignment/positioning module 269 may comprise suitable logic circuitry interfaces and/or code that may be operable to provide optimal alignment of the BNC/FSC dongle when the dongle is utilized for bridging across a barrier such as a dwelling wall. In this regard, a first portion of the BNC/FSC dongle may be operable to transmit test signals that are received by the second portion of the BNC/FSC dongle and a quality and strength of the signals that are received may be determined. LEDs, LCD, beeps, audio or other alert may be utilized to provide alignment cues and to indicate when both portions of the BNC/FSC dongle are optimally aligned. The test signals may be transmitted by one or both portions of the BNC/FSC dongle and received and assessed by one or both portions of the BNC/FSC dongle in order to determine when the corresponding BNC/FSC dongle is aligned to provide optimal communication between both portions of BNC/FSC dongle.

The alignment/positioning module 269 may comprise suitable logic, circuitry, interfaces and/or code that may be operable to aid with alignment of the BNC/FSC dongle so as to ensure optimal communication between two paired BNC/FSC dongles. The alignment/positioning module 269 may comprise a visual and/or audio indicator module 269*a* that may be operable to provide visual and/or audio cues that may aid in the alignment of both portions of the BNC/FSC dongle. The visual and/or audio indicator module 269*a* may comprise LED(s)/LCD(s) 269*b* and/or a speaker 269*c* that may be operable to generate voice, beeps, audio, text lights or other indicators, which may function as alignment cues. The alignment/positioning module 269 may be controlled by the processor 271.

The wired interface 261 may comprise suitable logic, circuitry, interfaces and/or code that may be operable to provide wired communication. For example, the wired interface may comprise an Ethernet or MoCA interface that enables the BNC/FSC dongle 260 to communicate via wires. In this regard, in instances where a paired BNC/FSC dongle may be affixed to a barrier such as a concrete wall, a first portion of the BNC/FSC dongle may be coupled to, for example, a router via an Ethernet connection and a second portion of the BNC/FSC dongle may be coupled to a PC via an Ethernet connection. Accordingly, the BNC/FSC dongle 260 may be operable to provide BNC/FSC bridging across the wall and the remaining connectivity may utilize a wired connection.

The Bluetooth transceiver 280 may comprise suitable logic, circuitry, interfaces and/or code that may be operable to communicate Bluetooth radio signals over the Bluetooth network 124. The Bluetooth transceiver 280 may be substantially similar to the Bluetooth transceiver 220, which is described with respect to FIG. 2A. In an example embodiment of the invention, in some instances, the Bluetooth transceiver 280 may be securely paired with other Bluetooth and BNC/FSC capable devices utilizing BNC such as the BNC/FSC enabled device 200 and the BNC/FSC dongle 260. In this regard, the BNC/FSC transceiver 270 may be operable to exchange authentication information over a BNC link for pairing the Bluetooth transceiver 280 with other Bluetooth and BNC/FSC capable devices.

In accordance with an example embodiment of the invention, in instances where a paired BNC/FSC dongle may be affixed to a barrier such as a concrete wall, a first portion of the BNC/FSC dongle may be coupled to, for example, a router via a first Bluetooth connection and a second portion of the BNC/FSC dongle may be coupled to a PC via second Bluetooth connection. Accordingly, the BNC/FSC dongle 260 may be operable to provide BNC/FSC bridging across the wall and the remaining connectivity may utilize a Bluetooth connection.

The WiFi transceiver 290 may comprise suitable logic, circuitry, interfaces and/or code that may be operable to communicate WiFi radio signals over the WiFi network 126. The WiFi transceiver 290 may be substantially similar to the WiFi transceiver 230, which is illustrated in FIG. 2A. The WiFi transceiver 290 may be enabled to support coexistence operations so as to receive WiFi signals while utilizing full spectrum capture in the BNC/FSC dongle 260. In an example embodiment of the invention, the WiFi transceiver 290 may utilize a dedicated RF front-end circuitry for data transmission and reception using WiFi. In another example embodiment of the invention, the WiFi transceiver 290 may share a RF front-end circuitry with the BNC/FSC transceiver 270 for data transmission and receiving using WiFi.

In accordance with an example embodiment of the invention, in instances where the BNC/FSC enabled device 200 comprises a BNC/FSC dongle that may be affixed to a barrier such as a concrete wall, a first portion of the BNC/FSC dongle may be coupled to, for example, a router via a first WiFi connection and a second portion of the BNC/FSC dongle may be coupled to a PC via a second WiFi connection. Accordingly, the BNC/FSC dongle may be operable to provide BNC/FSC bridging across the wall and the remaining connectivity may utilize a WiFi connection.

The processor 271 may comprise suitable logic, circuitry, interfaces and/or code that may be enabled to perform a variety of signal processing tasks such as channel selection or filtering, digital scaling, rate conversion, carrier/time synchronization/recovery, equalization/demapping, channel decoding and/or controlling the operation of the alignment/positioning module 269. The processor 271 may be substantially similar to the processor 240, which is illustrated in FIG. 2A. The processor 271 may be operable to coordinate and control operations of the BNC/FSC transceiver 270, the Bluetooth transceiver 280, and the WiFi transceiver 290 to communicate corresponding radio signals while utilizing full spectrum capture. For example, the processor 240 may manage, activate or deactivate the BNC/FSC transceiver 270 according to received Bluetooth signals via the Bluetooth transceiver 280. The processor 260 may also be operable to synchronize the operation of the BNC/FSC transceiver 270 and the Bluetooth transceiver 280, for example, so as to reduce time delay for accurately determining the location of an object of interest.

The processor 271 may be operable to control the alignment/positioning module 269. In this regard, the processor 271 may be operable to determine when two paired BNC/FSC dongles are positioned so as to provide optimal communication between the two sides of the BNC/FSC dongle. The processor 271 may be operable to control the generation and updating of visual and/or audio cues that are handled by the visual and/or audio indicator module 269a, which may be utilized to enable alignment of both portions of the BNC/FSC dongle. The visual cues may be provided by the LED(s)/LCD(s) 269b and the audio cues may be provided by the speaker 269c.

In various example embodiments of the invention, the processor 271 may enable configuration of the BNC/FSC dongle 260 to operate in different communication environments. In this regard, for example, power, distance and bandwidth may be configured in order to stay within the FCC masks and limits and at the same time, provide optimal performance across the entire bandwidth. The processor 271 may also control pairing of two BNC/FSC dongles.

The memory 291 may comprise suitable logic, circuitry, interfaces and/or code that may enable storage of data and/or other information utilized by the processor 271. For example, the memory 291 may be utilized to store information such as available operation spectrum bands that the BNC/FSC dongle 260 may operate, and channels in the available operating spectrum bands. The memory 291 may be enabled to store executable instructions to manage or configure the BNC/FSC transceiver 270, the Bluetooth transceiver 280, the alignment/positioning module 269, the wired interface 261 and/or the WiFi transceiver 290 for desired behavior. The memory 250 may comprise RAM, ROM, low latency nonvolatile memory such as flash memory and/or other suitable electronic data storage capable of storing data and instructions.

In operation, the processor 271 may be operable to pair two BNC/FSC dongles and to control the alignment/positioning module 269 so as to provide optimal alignment of the BNC/FSC dongle in instances when the BNC/FSC dongle is being utilized for bridging across a barrier such as a dwelling wall. The processor 271 may be operable to manage and control operation of the components of the BNC/FSC dongle 260 such as the BNC/FSC transceiver 270, the Bluetooth transceiver 280 and the WiFi transceiver 290 to communicate corresponding radio signals for applications of interest. Transceivers such as the BNC/FSC transceiver 270 may be enabled to utilize full spectrum capture for data communication to support the applications of interest. For example, a transceiver such as the BNC/FSC transceiver 270 may be enabled to digitize the entire operation spectrum band, 1 GHz, for example, for instant access to channels anywhere in the operation spectrum band.

Figure 3:
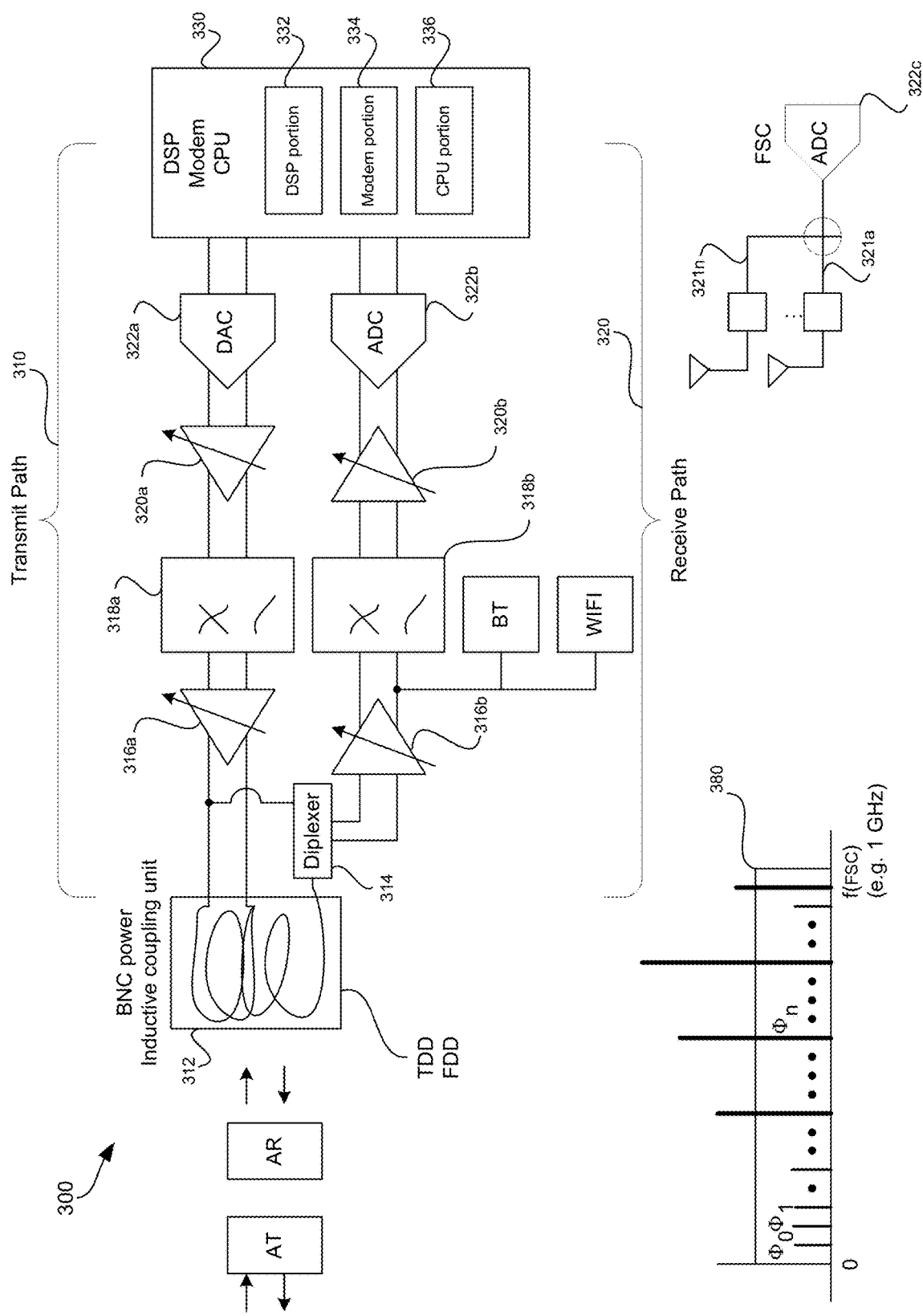
FIG. 3 is a block diagram that illustrates an example controller, such as a broadband near-field communication (BNC) controller for example, utilizing full spectrum capture (FSC), in accordance with an example embodiment of the invention.

FIG. 3 is a block diagram that illustrates an example controller, such as a broadband near-field communication (BNC) controller for example, utilizing full spectrum capture (FSC), in accordance with an example embodiment of the invention. Referring to FIG. 3, there is shown a controller 300, which may be, for example, a BNC/FSC controller. The BNC/FSC controller 300 may comprise a transmit path 310 and a receive path 320, which share a DSP/Modem/CPU unit 330. A BNC power inductive coupling unit 312 is coupled to a diplexer 314 such that the BNC power inductive coupling unit 312 may be shared by the transmit path 310 and the receive path 320 for data transmission and data receiving, respectively, over channels, $\phi_1, \ldots, \phi_n$, within a full spectrum band 380. In addition, the transmit path 310 may comprise variable gain amplifiers 316a and 320a, a transmit filter 318a, and a DAC 322a. The receive path 320 may comprise variable gain amplifiers 316b and 320b, a receive filter 318b, and an ADC 322b.

In an example operation, the BNC power inductive coupling unit 312 may comprise suitable logic, circuitry, interfaces and/or code that may be utilized as an antenna for wireless communication operations for signal transmission and reception through the transmit path 310 and the receive path 320, respectively. The BNC power inductive coupling unit 312 may comprise a single near-field inductive coupling device such as a coil or an antenna or an antenna coil, for example. In some instances, the single coil may be utilized for wireless communication operations that are based on time-division duplexing (TDD) and/or frequency-division duplexing (FDD). In addition to being utilized as an antenna for wireless communication operations, the single coil may be utilized for receiving charge from a charging pad, for example, to power or operate at least a portion of the device that comprises the various components shown in FIG. 3. The coil may be communicatively coupled to circuitry (not shown) that may be utilized to manage and/or store the received charge.

In an example embodiment of the invention, the coil of the BNC power inductive coupling unit 312 may comprise a plurality of coil turns. In this regard, the number of coil turns that correspond to the receive path 320 may be larger than the number of coil turns that correspond to the transmit path 310 so as to obtain a low transmit gain and high receive gain operation.

In an example embodiment of the invention, the BNC power inductive coupling unit 312 may also be equalized as part of full spectrum capture, when used as an antenna. Unlike narrowband systems in which the signals are narrowband compared to the characteristics of the antenna, the antenna in full spectrum capture may typically not be optimized for the application. Since the operation for full spectrum capture may be at lower frequencies and at low powers than other wireless technologies, it may be possible to utilize antennas with poor characteristics by equalizing the power provided to the antenna. In this manner, the power from the antenna may be maximized without violating any Federal Communications Commission (FCC) constraints. A sensor may be implemented to detect or sense the impedance of the antenna across a range of frequencies. The output from the sensor may be provided as feedback for digital processing to enable sub-carrier equalization in order to obtain an optimal power transfer out of the antenna. For example, at frequencies where the antenna performance is poor (e.g., 10% efficiency), the power may be increased to overcome the inefficiencies. Since only a few frequencies may require additional power to compensate for the inefficiencies, the overall power transmitted may still be within FCC requirements. For example, power for certain frequencies may be increased by as much as 30 dB while the overall power transmitted remains within FCC requirements. In some instances, there may be a correspondence between the frequencies at which the transmit antenna has poor performance and the frequencies at which the receive antenna has poor performance. This correspondence may be utilized for purposes of antenna equalization. Antenna equalization may comprise over-compensation and/or under-compensation at one or more frequencies based on the characteristics of the transmit antenna and/or the receive antenna.

In order to combine the phase carriers, equalization may need to be performed. To utilize equalization, there may be known pilot symbol patterns, which may be scattered throughout the portion of the spectrum being considered. The pilot symbols may be at a known phase and are not randomized nor modulated by a data stream. The whole channel may be equalized based on these pilot symbols, which enables phase recovery. By utilizing pilot symbols, OFDM or WCDMA techniques may be supported for the modem portion described above. In broadcast, OFDM techniques may be utilized in which pilot symbols or pilot tones may be picked up, the pilot symbols or pilot tones being fixed or scattered and rotated over time. WiFi on the other hand, may utilize preambles and/or pilot symbols to enable synchronization.

In an example embodiment of the invention, high receive gain may also be achieved by aiming the antenna in a particular direction. For full spectrum capture in personal area networks, for example, omni-directional antennas for both transmit and receive operations may be more suitable than asymmetric antennas. On the other hand, for communicating or penetrating across a wall for indoor dwelling or other like barrier, an asymmetric antenna configuration may be more suitable for full spectrum capture since it may be preferable to receive in one direction and not the other.

The transmission characteristics of a remote antenna or coil may be represented and/or modeled by the block labeled area of transmission (AT), while the reception characteristics of a local antenna or coil may be represented and/or modeled by the block labeled area of receiving (AR). In an example embodiment of the invention, the remote antenna may also have reception characteristics and the local antenna may also have transmission characteristics.

In one example embodiment of the invention, synchronization may occur by utilizing a standard frequency pattern for the antenna when a lower coding rate with more coding protection is being utilized. Once two devices are synchronized, the devices may start a negotiation to optimize the channel. For example, each device may provide antenna performance information and/or channel conditions information to the other device based on an information conveyance protocol. By utilizing the protocol information, impedance sensing, and signal processing, the channel conditions may be identified and considered when determining the transmit power distribution across antenna frequencies. In this regard, the devices may be operable to perform signal processing algorithms that allow the devices to dynamically determine local and remote antenna characteristics, and/or channel conditions or impairments, including the presence of blockers or interferers, for example. A tracking scheme may be implemented for exchanging channel and/or antenna characteristics, which may include a preamble, a pattern field, and/or decoding rate information. These operations may be performed at the PHY and/or MAC layers, for example, through the DSP/Modem/CPU unit 330.

Some of the techniques described above may be applied to overcome the poor performance that some antennas may have over a wide spectrum. The wide spectrum requirements of full spectrum capture are such that the ratio of the lower frequencies to the higher frequencies is higher than a similar ratio for ultra-wideband (UWB), for example. As a result, antenna characteristics over the wide spectrum of full spectrum capture operation may be continuously monitored and considered where such operations may not be needed for UWB.

In example embodiments of the invention, other wireless technologies, for example, ZigBee, Bluetooth, WLAN, and WiMAX, may be supported in addition to full spectrum capture. In this regard, a separate and/or better antenna may be needed to support TDD for Bluetooth, for example, at least on the receive path 320. The transmit path 310 may be a reverse implementation of the receive path 320. In ZigBee, Bluetooth, WLAN, and WiMAX, there may be mixing and filtering operations at the front end that allows the signal path to have a narrower band than full spectrum capture, which in turn may benefit from a dedicated antenna.

In an example embodiment of the invention, other wireless technologies such as, for example, ZigBee, Bluetooth, WLAN, and WiMAX may coexist with full spectrum capture in the same BNC/FSC enabled device 200. In this regard, coexistence operations may be supported. Two or more receive antennas may be utilized, each of which receives signals from different wireless technologies such as, for example, ZigBee, Bluetooth, WLAN, and WiMAX. Each of the received signals may be processed or filtered before they are all combined and digitally converted for full spectrum capture operations. In addition, utilizing device components such as the ADC 322b and/or the DAC 322a, which require less power, may enable multimode devices. In an example embodiment of the invention, multimode devices such as the BNC/FSC enabled device 200 may utilize full spectrum capture as a single radio to support multiple modes or as a universal interface by having one or more of the analog components, such as the filters, for example, be band-selectable or tunable. The data converter may still run at the appropriate rate to enable handling of the filtered data. In this regard, the full spectrum capture may be utilized for Bluetooth, IEEE 802.11, and/or WiFi communications.

In some example embodiments of the invention, a delta-sigma bandpass converter may be utilized in connection with the ADC 322b such that the sampling may have a transfer function that peaks at a certain frequency and drops off at other frequencies. By having a converter that has a band-pass transfer function and not a low-pass transfer function it may be possible to modify the ADC 322b and perform conversion operations utilizing less power.

Operating full spectrum capture at higher frequencies, such as 5 GHz or 10 GHz, for example, based on an efficient ADC and/or DAC, may support capture or reception of IEEE 802.11 signals. The filtering and processing may be performed digitally. In some instances, the front-end of the full spectrum capture may be made coarsely tunable to be able to remove, in the analog domain, certain frequencies, bands, and/or unwanted intermediate data. Such an approach may provide an improvement in dynamic range. Digital signal processing may then be utilized for any further filtering operations that may be needed.

In an example embodiment of the invention, the full spectrum capture may be implemented without mixers. In this regard, the data pipe may remain large until the data becomes digital. In addition, not having mixers in full spectrum capture may remove additional components in the transmit path 310 and the receive path 320 that may result in a lowered dynamic range. Distortion and/or noise performance may also be improved since mixers are not included in the transmit path 310 and the receive path 320.

The diplexer 314 may comprise suitable logic, circuitry, interfaces and/or code that may be operable to reduce the likelihood that signal transmission may saturate the receive path 320. The diplexer 314, however, may not be needed when very low power levels are utilized over a wide bandwidth, as may occur during full spectrum capture operations. In such instances, transmission and reception of signals may occur concurrently without having signal transmission interfere with signal reception. In some example embodiments of the invention, a switch may be utilized instead of the diplexer 314 to switch between transmission and reception in TDD communications.

The transmit filter 318a and the receive filter 318b may comprise suitable logic, circuitry, interfaces and/or code that may be operable to provide or perform spectral filtering to support full spectrum capture operations. In this regard, the transmit filter 318a and the receive filter 318b may be utilized to filter frequencies outside the full spectrum capture frequency range. In some instances, the characteristics of the antenna (e.g., coil) may be such that it may perform filtering functions and, in those instances, transmit and/or receive filters may not be needed.

The DAC 322a and the ADC 322b may comprise suitable logic, circuitry, interfaces and/or code that may be operable to perform Digital to Analog data generation or conversion and Analog to Digital data collections, respectively. In an example embodiment of the invention, the DAC 322a and the ADC 322b may be operable to perform high speed digital-to-analog and analog-to-digital conversion, respectively. In this regard, the DAC 322a and the ADC 322b may be operable at very high speeds to enable full spectrum capture. The digital signals produced by the ADC 322b and received by the DAC 322a may be referred to as digital baseband signals. The DAC 322a and the ADC 322b may be communicatively coupled to the DSP/Modem/CPU unit 330.

The various variable gain amplifiers 316a and 320a, and 316b and 320b may comprise suitable logic, circuitry, code, and/or interfaces that may be operable to have the gain that may be applied by the variable gain amplifier 316a, for example, to an input signal be programmable or controlled. One or more of the variable gain amplifiers in the transmit path 310 may comprise power amplifiers, while one or more of the variable gain amplifiers in the receive path 320 may comprise low-noise amplifiers. The various variable gain amplifiers 316a and 320a, and 316b and 320b may be operable to handle low levels of power spread over a wide bandwidth to support full spectrum capture operations.

The DSP/Modem/CPU unit 330 may comprise circuitry that may comprise a digital signal processor (DSP) portion 332, a modulator-demodulator (modem) portion 334, and/or a central processing unit (CPU) 336. The DSP portion 332 may comprise suitable logic, circuitry, code, and/or interfaces that may be operable to clean up signals. For example, the DSP portion 332 may be operable to perform channel selection and/or filtering, digital scaling, and/or rate conversion. The rate conversion or sample rate conversion may be performed utilizing variable rate interpolators. For example, a 13.5 MHz signal that is received may be interpolated down to a 13.3 MHz signal during rate conversion operations.

The modem portion 334 may comprise suitable logic, circuitry, code, and/or interfaces that may be operable to perform synchronization, equalization and/or demapping, and/or channel encoding when processing received signals. The channel decoder may utilize a concatenated code such as an inner code and an outer code. An example of such a concatenated code may comprise a low-density parity-check (LDPC) code followed by a Bose-Chaudhuri-Hocquenghen (BCH) code. The channel decoder may utilize a concatenated code that comprises a Viterbi code, for example. The modem portion 334 may also be operable to perform channel encoding and/or equalization, and/or mapping when processing signals for transmission. During transmission synchronization is typically not needed. The operation of the modem portion 334 may be implemented using an orthogonal frequency-division multiplexing (OFDM) approach or an approach based on code division multiple access (CDMA).

The CPU portion 336 may comprise suitable logic, circuitry, code, and/or interfaces that may be operable to support MAC layer and/or Link layer operations for full spectrum capture. The MAC layer may support the ability to share the medium, which utilizing full spectrum capture allows the medium to be shared with fewer collision type issues. For example, when everyone is sending less than the full bandwidth (e.g., 1 GHz), the operation may be easier than if everyone is trying to send close to the full bandwidth, in which case some form of negotiation between devices may be supported by the MAC layer.

The MAC layer and the Link layer enable access sharing, which may use OFDM techniques or some form of CDMA as described above. Simple CDMA techniques may also be used. For CDMA-like operations, low-power multiple phase carriers may be sent, such as 8 k, 10 k, 12 k, 32 k, or 64 k, for example. Each of the phase carriers may have a random phase. When the random phase is known, a scan or search may be performed for those known phase carriers. In some instances, there may be one or more preset channels for each search. Since the power utilized in full spectrum capture is typically very low, the search or scan goes through each of the channels. If the different phase carriers may be combined, it may be possible to obtain a significant coding or dispreading gain. OFDM techniques may provide, at least in some instances, an approach in which some of the subchannels may be left out or left unused, especially when it is known that those channels may have some form of interference. For example, it may be preferable not to transmit in certain channels that are known to be dead and/or where it may be preferable to ignore information from a channel that has noise and is likely to degrade the performance of the combined signal.

In some example embodiments of the invention, the spectral bandwidth corresponding to full spectrum capture operations may extend to a frequency (e.g., $f_{FSC}$) of approximately 1 GHz, for example. The full spectrum capture spectral bandwidth may depend on the frequency of operation of the ADC 322b and/or of the DAC 322a. If the ADC 322b and/or the DAC 322a is operable to capture 10 GHz of bandwidth, for example, full spectrum capture at or near 10 GHz may be performed.

In an example embodiment of the invention, the BNC/FSC enabled device 200 may comprise one or more other receive paths 321a-321n in addition to the receive path 320 with full spectrum capture. In this regard, the one or more other receive paths 321a-321n may comprise components for handling received signals via WiFi, WiMAX, ZigBee, RFID, and/or Bluetooth. In an example embodiment of the invention, when supporting additional wireless technologies, such as Bluetooth and/or WiFi, for example, a portion of the receive path 320 with full spectrum capture may be coupled to the one or more other receive paths 321a-321n. In other words, the BNC/FSC enabled device 200 may be configured to utilize different RF front ends to support communication via additional wireless technologies. In an example embodiment of the invention, the BNC/FSC enabled device 200 may be configured to utilize a single RF front end to handle communication via BNC/FSC, WiFi, WiMAX, ZigBee, RFID, BNC and Bluetooth.

In one example embodiment of the invention, a device such as the BNC/FSC enabled device 200 may support a processing path for full spectrum capture and another processing path for narrowband communication. The device may be operable to switch between the two based on the operation of the BNC/FSC enabled device 200. Moreover, when switching to the narrowband communication processing path, the amount of power under consideration may drop from the amount of power being handled by the full spectrum capture processing path. The narrowband communication processing path may share some components with the full spectrum capture processing path such as low-noise amplifiers 316a, 316b, 320a and 320b.

Figure 4:
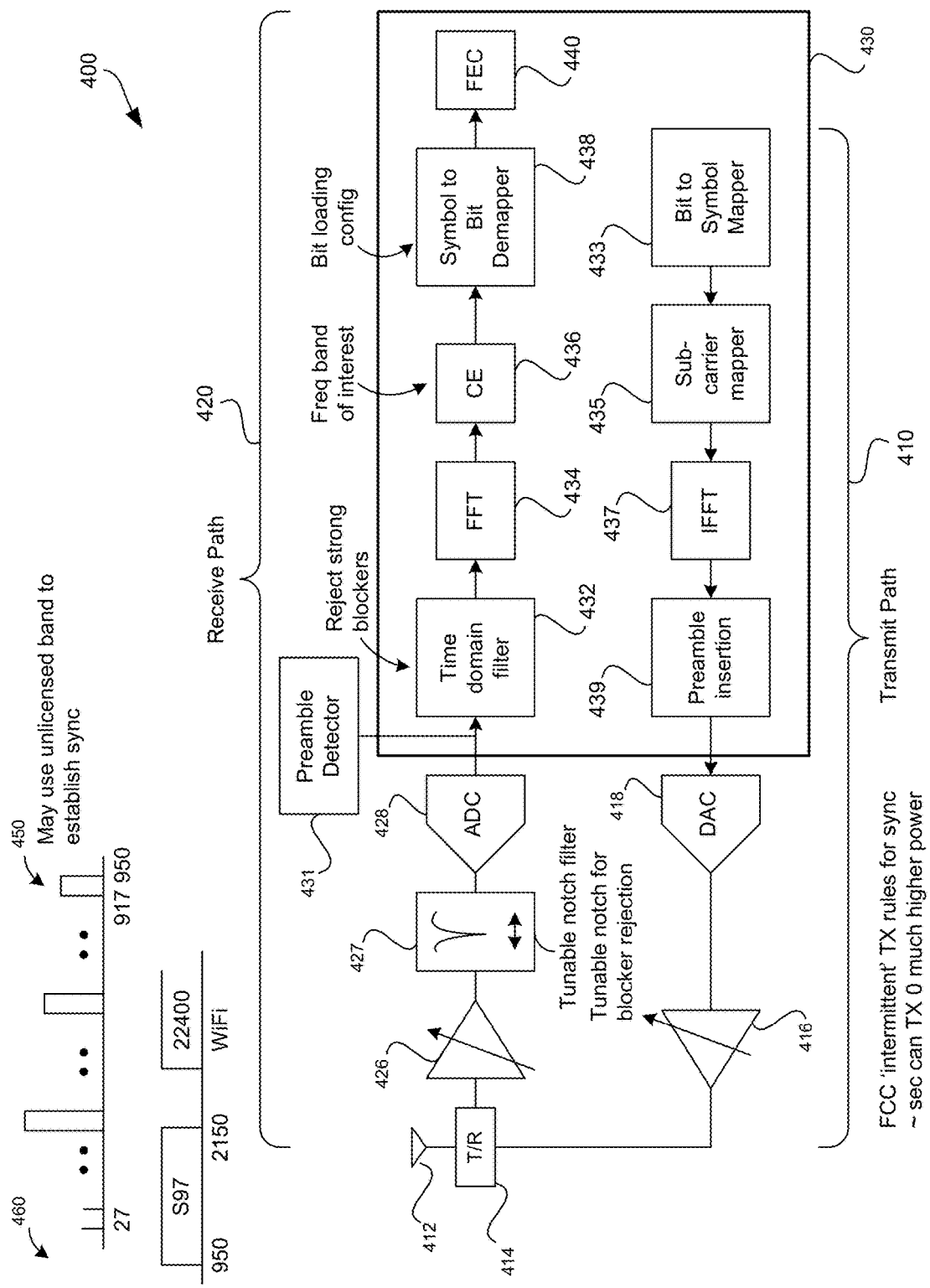
FIG. 4 is a block diagram that illustrates an example implementation for a controller, such as a broadband near-field communication (BNC) controller for example, that utilizes a tunable notch filter in a receive path with full spectrum capture (FSC), in accordance with an example embodiment of the invention.

FIG. 4 is a block diagram that illustrates an example implementation for a controller, such as a broadband near-field communication (BNC) controller for example, that utilizes a tunable notch filter in a receive path with full spectrum capture (FSC), in accordance with an example embodiment of the invention. Referring to FIG. 4, there is shown a controller 400, which may be a hybrid BNC/FSC controller, for example. The hybrid BNC/FSC controller 400 may comprise a transmit path 410, a receive path 420, and a DSP/Modem/CPU unit 430. In addition, the transmit path 410 may comprise a variable gain amplifier 416 and a DAC 418. The receive path 420 may comprise a variable gain amplifier 426, a tunable notch filter 427, and an ADC 428. The transmit path 410 and the receive path 420 may be coupled to the same antenna 412 through a transmit-receive (T/R) switch 414. In this regard, the variable gain amplifiers 416 in the transmit path 410 may be turned off during receive, and the variable gain amplifiers 426 in the receive path 420 may be turned off when transmit. The antenna 412, the variable gain amplifiers 416 and 426, the DAC 418 and the ADC 428 may be similar to the BNC power inductive coupling unit 312, the variable gain amplifiers 316b, 320a, the DAC 322a, and the ADC 322b of FIG. 3, respectively.

The T/R switch 414 may comprise suitable logic, circuitry, interfaces and/or code that may be operable to switch between transmit and receive. In some example embodiments of the invention, the T/R switch 414 may be positioned or placed between the variable gain amplifier 426 and the tunable notch filter 427 in the receive path 420. In some instances, since the power being transmitted may be low enough, the T/R switch 414 may not be needed.

The tunable notch filter 427 may comprise suitable logic, circuitry, code, and/or interfaces that may be operable to reject a blocker or interference signal. The blockers may be strong and saturate the ADC 428. In this regard, the tunable notch filter 427 may be utilized to remove the strongest blocker. The tunable notch filter 427 may be implemented on-board or on-chip, for example. For high frequencies, the tunable notch filter 427 may be on-chip, and for low frequencies, it may be off-chip. While the tunable notch filter 427 may affect the frequencies that are adjacent to the frequency being removed, the full spectrum capture spectrum overall may not be significantly affected because of the broadband nature of full spectrum capture. Sensing circuitry may be utilized to detect the strong blockers and provide feedback to adjust the frequency of the tunable notch filter 427.

The receive path 420 may also comprise a preamble detector 431, a time-domain filter 432, a Fast Fourier Transform (FFT) block 434, a channel equalizer (CE) 436, a symbol to bit demapper, and/or a forward error correction (FEC) block 440. The preamble detector 431 may comprise suitable logic, circuitry, code, and/or interfaces that may be operable to detect OFDM symbols in time domain from time domain samples from the tunable notch filter 427. The time-domain filter 432 may comprise suitable logic, circuitry, code, and/or interfaces that may be operable to reject strong blocker signals. The FFT block 434 may comprise suitable logic, circuitry, interfaces and/or code that may be operable to perform Fast Fourier Transform (FFT) over OFDM symbols from the time domain filter 432. The FFT block 434 may be operable to convert time domain samples of the OFDM symbols to corresponding frequency domain samples for frequency domain channel equalization via the CE 436. The CE 436 may comprise suitable logic, circuitry, code, and/or interfaces that may be operable to provide channel equalization for frequency bands of interest utilizing frequency domain samples supplied from the FFT block 434. The symbol to bit demapper 438 may comprise suitable logic, circuitry, code, and/or interfaces that may be operable to perform bit-loading configuration.

The transmit path 410 may also comprise a bit to symbol mapper 433, a sub-carrier mapper 435, an Inverse Fast Fourier Transform (IFFT) block 437, and/or a preamble insertion block 439. The bit to symbol mapper 433 may comprise suitable logic, circuitry, code, and/or interfaces that may be operable to perform symbol-loading configuration. The sub-carrier mapper 435 may comprise suitable logic, circuitry, code, and/or interfaces that may be operable to map sub-carriers to avoid regulated frequencies. The avoidance of regulated frequencies may be binary or graduated. The IFFT block 437 may comprise suitable logic, circuitry, interfaces and/or code that may be operable to perform Inverse Fast Fourier Transform (IFFT) over frequency domain samples of OFDM symbols from the sub-carrier mapper 435. The IFFT block 437 may be operable to convert frequency domain samples of the OFDM symbols to corresponding time domain samples. The preamble insertion block 439 may comprise suitable logic, circuitry, code, and/or interfaces that may be operable to insert a preamble into time domain samples from the IFFT block 437 in a manner that deals with frequency avoidance.

Although OFDM-based implementation is illustrated for full spectrum capture, the invention may not be so limited. Accordingly, other wireless technologies such as CDMA technology and WCDMA (spread spectrum approach) technology may also be utilized for full spectrum capture without departing from the spirit and scope of various example embodiments of the invention.

In example embodiment of the invention, on the receive path 420, the variable gain amplifier 426, as a LNA typically drives the very fast ADC 428 in order to achieve full spectrum capture performance. The full spectrum capture operations may be typically used with packet-based systems. In example embodiment of the invention, the full spectrum capture operations may comprise having a MAC layer picking which frequency bands are to be used and coordinating that information with the device front-end. The MAC layer may also determine and/or coordinate bit loading, for example. In this regard, the MAC layer may determine which frequencies have good signal-to-noise ratio (SNR) and which ones do not, and may allocate more bits to the ones with good SNR than to those with lower SNR.

In example embodiment of the invention, on the transmit path 410, there may be frequency ranges in which the full spectrum capture may not want to transmit. For example, the full spectrum capture may be explicitly prohibited by regulatory rules from transmitting in certain frequencies. In another example, the BNC/FSC enabled device 200 may sense that a television channel is being used and may not want to transmit in that frequency. As described above, the avoidance of certain frequencies may be implemented in a binary or graduated fashion. For example, in a binary case, transmission at a certain frequency or note may be ON or OFF. For the graduated case, the power level of the transmitted signal may be based on how strong other signals are in that same frequency. For example, the power level may be stronger for transmission at the frequency of the television channel when the signal strength of the television channel is low, which may indicate that the signal is far away.

To start communication between two devices, a time reference may be established and there be an agreement about which frequencies are to be utilized. In example embodiment of the invention, various ways in which synchronization may be supported may be utilized by the hybrid BNC/FSC controller 400. For example, one way that may be supported may be for the hybrid BNC/FSC controller 400 that supports full spectrum capture to awake and look for preambles or beacons of some sort. This approach may consume a lot of power. Another approach that may be supported may be to have both sides, that is, the two peer devices that are to communicate, look at one or more pulse per second (PPS) signals used in global positioning systems (GPS). When any one device wakes up, it may be realigned based on a PPS signal. In some instances, the PPS signal that may be utilized for synchronization is from another device that is nearby. This type of synchronization may occur even when there is a lot of drift and/or when there is some degree of inaccuracy with the PPS signal. In some example embodiments of the invention, there may be an indication received or generated by the device of how accurate the PPS signal is in order to determine whether the PPS signal is suitable for synchronization.

In example embodiment of the invention, the hybrid BNC/FSC controller 400 may utilize unlicensed bands to establish synchronization. In this regard, synchronization information may also be provided in an unlicensed band, such as the cordless region 450, for example, between 917 MHz and 950 MHz. The hybrid BNC/FSC controller 400 may look into this region of the spectrum to find synchronization information. Similarly, frequencies down at around 27 MHz (e.g., frequencies for operation of garage door openers) 460 may be utilized by devices looking for synchronization information.

In some example embodiments of the invention, the two peer devices looking to synchronize may operate based on an established agreement on time regarding how long to look for a neighbor to synchronize. Since synchronization may take some time at relatively large power levels, looking for a neighbor for a long period of time may result in power being drained from the searching device.

In an example embodiment of the invention, preset OFDM symbols with randomized phases may be utilized in a correlation operation to enable synchronization with another device. With OFDM enabled, when a preamble is utilized, the preamble may typically cover the entire frequency band. The preamble may need to be changed to avoid certain frequencies as determined by regulatory rules and/or operating conditions. The preamble may then be implemented before the FFT block 434 in the receive path 420. Both sides may need to be aware of the preamble characteristics in order to enable communication between them.

In example embodiment of the invention, the full spectrum capture may provide very short duty cycles for low power. In this regard, FCC intermittent burst allows for the transmission, at the packet level, of much higher power during short burst. The amount of power that is provided may be based on the frequency.

Figure 5:
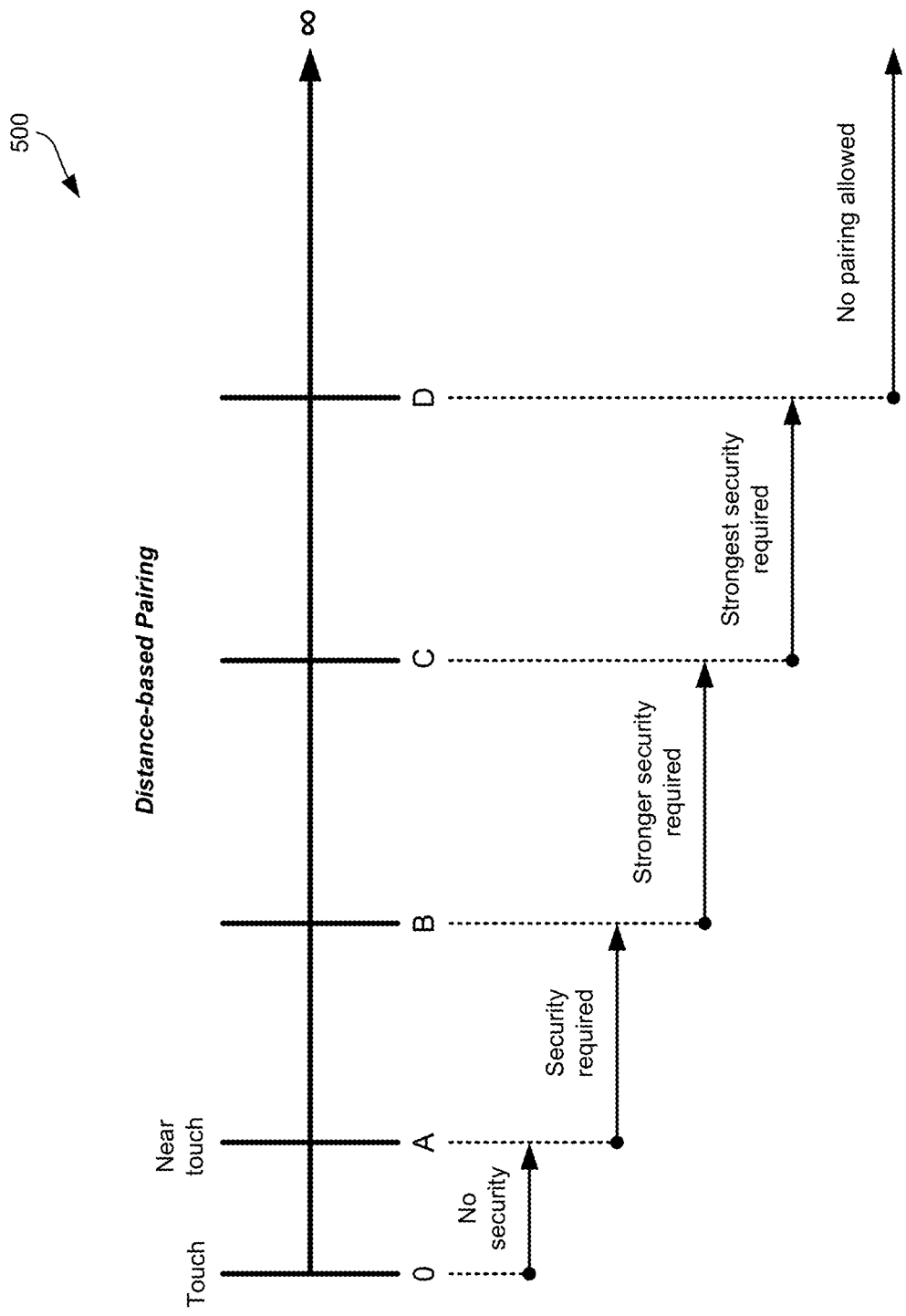
FIG. 5 a chart that illustrates example distance-based pairing scheme of devices, such as BNC/FSC devices for example, in accordance with an example embodiment of the invention.

FIG. 5 a chart that illustrates example distance-based pairing scheme of devices, such as BNC/FSC devices for example, in accordance with an example embodiment of the invention. Referring to FIG. 5, there is shown a distance-based pairing chart 500. In various example embodiments of the inventions, a sliding scale may be utilized for secured pairing of BNC/FSC enabled devices such as a BNC/FSC dongle.

The two BNC/FSC enabled devices that are to be paired may be placed very close to each other and their power may be controlled to the point where they may just hear each other and thus may not be heard by any other listening device. At that point, security information such as keys may be exchanged and the two devices paired using full spectrum capture. In an example embodiment of the invention, depending on distance between the two BNC/FSC enabled devices, different levels of security may be applied for pairing. In this regard, pairing may occur at varying distances. The closer together the two BNC/FSC enabled devices are, the lesser the security that is needed. On the other hand, the further apart two BNC/FSC enabled devices are, the greater the security that is needed for pairing. For example, if the two BNC/FSC enabled devices, between 0 and A, are touching or near touching, then no security request is needed. In other words, users of the two BNC/FSC enabled devices do not care whether the content is communicated without security, so long as the communication occurs and/or occurs within a certain range (between 0 and A).

If the two BNC/FSC enabled devices, between A and B, are near touching, then a first security scheme may be utilized. If the two BNC/FSC enabled devices are between B and C, 5 cm apart, for example, a second security scheme may be utilized, where the second security scheme may be stronger than the first security scheme. If the two BNC/FSC enabled devices are between B and C, 20 cm apart, for example, a third security scheme may be utilized, where the third security scheme may be stronger than the second and the first security schemes. If the two BNC/FSC enabled devices are beyond D, greater than 100 cm, for example, no pairing may be allowed.

A security scheme may comprise data categories that may be communicated between the two BNC/FSC enabled devices. In an example embodiment of the invention, the two BNC/FSC enabled devices may be operable to communicate secure data only when the two BNC/FSC enabled devices are located at a certain distance. For example, the two BNC/FSC enabled devices may only communicate data when they are located at one meter or less apart. If the two BNC/FSC enabled devices are located at a distance greater than one meter, they may communicate only non-secure data. If the two BNC/FSC enabled devices are located more than 2 meters apart, then they may not communicate at all. Those two BNC/FSC enabled devices may only know the channel between the two BNC/FSC enabled devices and both devices share the same spectrum.

Another example embodiment of the invention may also provide a layered approach for data communication between the two BNC/FSC enabled devices. In this regard, data may be assigned to a particular layer and only data that is in a particular layer may be communicated based on the distance. A data type may specify what kind of data is in each particular layer. For example, secure data in layer 1 may only be communicated when both devices are less than ½ meter apart. Non-secure data in layer 2 may only be communicated in instances when both devices are less than or equal to 1.5 meters apart. Non-secure data in layer 3 may only be communicated in instances when both devices are less than or equal to 2 meters apart. Non-secure data in layer 4 may only be communicated in instances when both devices are less than or equal to 2.0 meters apart, and so on.

Devices may be identified by, for example, MAC addresses. If a known or trusted device is within a certain range, then communication may be permitted with little or no security based on the device identity. However, once the trusted device is out of range, then security may be required to facilitate communication. For example, a successful challenge may be required for communication to occur.

Figure 6:
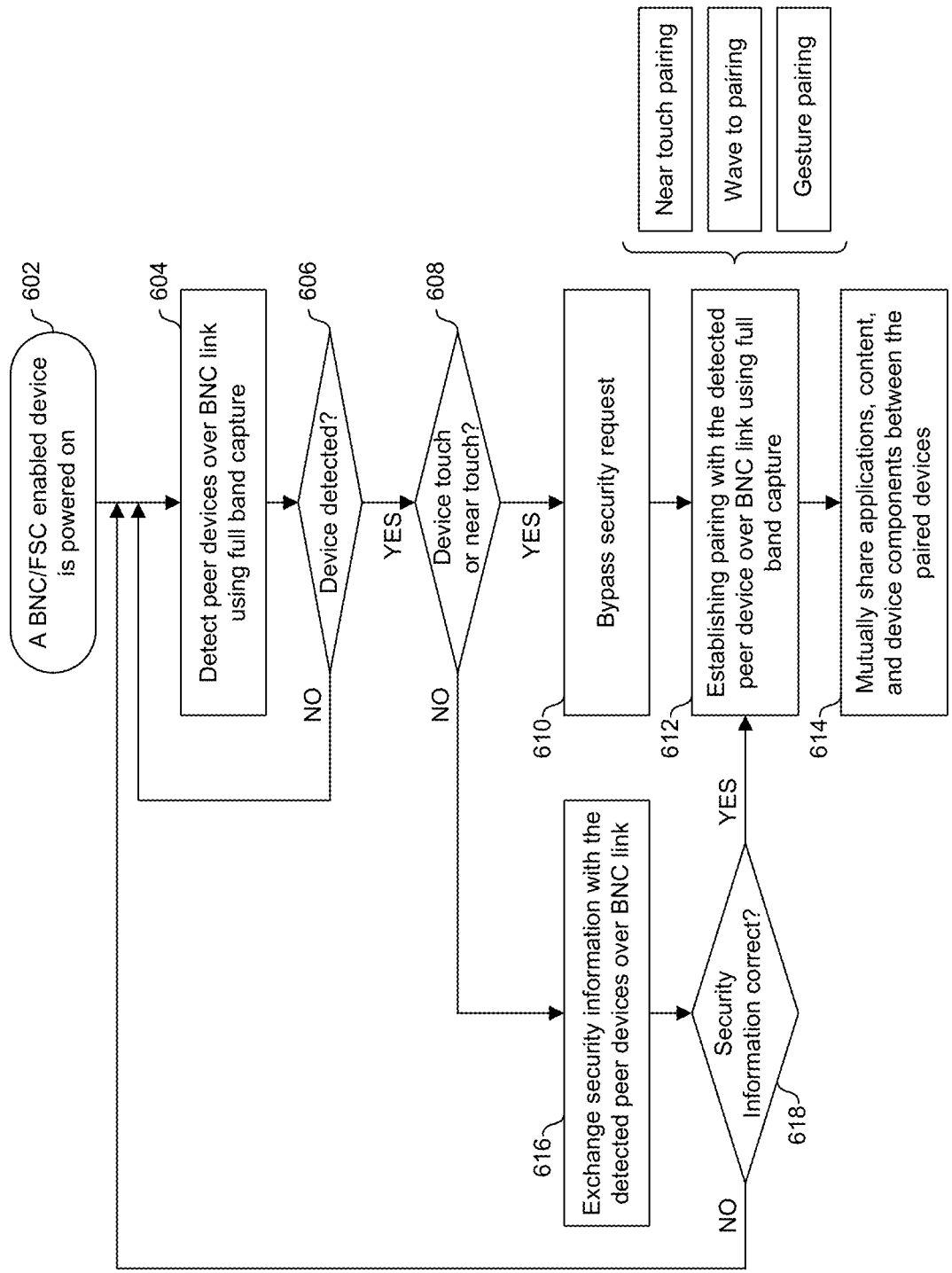
FIG. 6 is a flow diagram that illustrates example steps for device pairing and security in broadband near-field communication (BNC) utilizing full spectrum capture (FSC), in accordance with an example embodiment of the invention.

FIG. 6 is a flow diagram that illustrates example steps for device pairing and security in broadband near-field communication (BNC) utilizing full spectrum capture (FSC), in accordance with an example embodiment of the invention. Referring to FIG. 6, in step 602, a BNC/FSC enabled device such as the BNC/FSC enabled device 200 is powered on. The BNS/FSC enabled device may comprise a BNC/FSC dongle 260 that may be operable to communicate across a barrier such as a dwelling wall. In this regard, the two BNC/FSC devices that are placed on either side of the dwelling wall may comprise peer devices that may be paired.

The example steps start in step 604, where the BNC/FSC enabled device 200 may be operable to detect peer devices over BNC link utilizing full spectrum capture. For example, the BNC/FSC enabled device 200 may monitor signals or messages received via the BNC power inductive coupling unit 312 for device-identifying reference information such as a MAC-ID, MSN or a peer address in the communication network, where the pairing takes place. In step 606, the BNC/FSC enabled device 200 may determine whether peer BNC/FSC enabled devices are detected over a BNC link. In instances where one or more peer BNC/FSC enabled devices are detected, then in step 608, the BNC/FSC enabled device 200 may determine whether it touches or nearly touches the detected peer BNC/FSC enabled devices. In instances where the BNC/FSC enabled device 200 touches or nearly touches the detected peer BNC/FSC enabled devices, then in step 610, the BNC/FSC enabled device 200 may bypass security request. In other words, the BNC/FSC enabled device 200 may not exchange or communicate security information with the detected peer BNC/FSC enabled devices. The security information may comprise user account names and logo, password, PIN number and other credentials, security categories, encryption keys, cryptographic keys, an authentication value and sequence number, signatures to be included, digital certificates, source IP address, destination IP address, and/or port numbers.

In step 612, the BNC/FSC enabled device 200 may be operable to establish pairing with each of the detected peer BNC/FSC enabled devices over BNC link using full spectrum capture. The pairing may comprise near touch pairing, wave to pairing and gesture pairing. Touch or near touch pairing refers to pairing the BNC/FSC enabled device 200 with a peer BNC/FSC enabled device by simply touching or near touching the two BNC/FSC enabled devices to be paired or connected to the network. Wave to pair enables the pairing of two BNC/FSC enabled devices when they are within certain proximity of each other, for example, ¼ of a wavelength of each other. In this regard, one device may be waved next to the other within the distance of ¼ wavelength to accomplish pairing.

In one example embodiment of the invention, the waving may have to occur in a specific manner or pattern to effectively pair the two BNC/FSC enabled devices. If the waiving is not done in that specific manner or pattern, then no pairing is done and the devices may not communicate with each other or will not communicate secure information with each other. This is done, for example, to avoid unintended pairings based simply on proximity in crowded environments. This signature for waving or waving in a particular pattern may be referred to as gesture or signature pairing. In this regard, the device would not only need to be within certain proximity, but also would need to be moved or waived in a pre-defined manner, during which the devices are brought into such proximity. The BNC/FSC enabled devices may take advantage of existing motion/directional devices, such as a gyroscope, to capture a unique gesture or signature for each user, and only pair the communication device if that gesture or signature is detected during a proximity event.

In step 614, the BNC/FSC enabled device 200 may mutually share applications, multimedia content or files, and device components such as display with the detected peer BNC/FSC enabled devices. In this regard, sharing of the display, multimedia content or files may occur among the BNC/FSC enabled device 200 and the detected peer BNC/FSC enabled devices regardless of who is receiving the display content. For example, a user of BNC/FSC enabled device 200 at a mall may take a picture and share the screen, which displays the picture, with all their friends who are standing there. In this regard, the user is not concerned whether someone is eavesdropping and is viewing the picture. The BNC/FSC enabled device 200 may be controlled so the signals are not communicated beyond a certain range.

In an example embodiment of the invention, a secure communication session may be established for paired devices based on proximity. In this regard, devices may be excluded from the secure communication session if they are located outside that proximity.

In step 606, in instances where no peer BNC/FSC enabled device is detected, then the example steps return to step 604.

In step 608, in instances where the BNC/FSC enabled device 200 does not touch or near touch the detected peer BNC/FSC enabled devices, then in step 616, where the BNC/FSC enabled device 200 may exchange security information with the detected peer devices over BNC link. In step 618, the BNC/FSC enabled device 200 may determine whether the security information from the detected peer devices is correct. In instances where the received security information is correct, then example process continues in step 612. Otherwise the example steps return to step 604.

Figure 7:
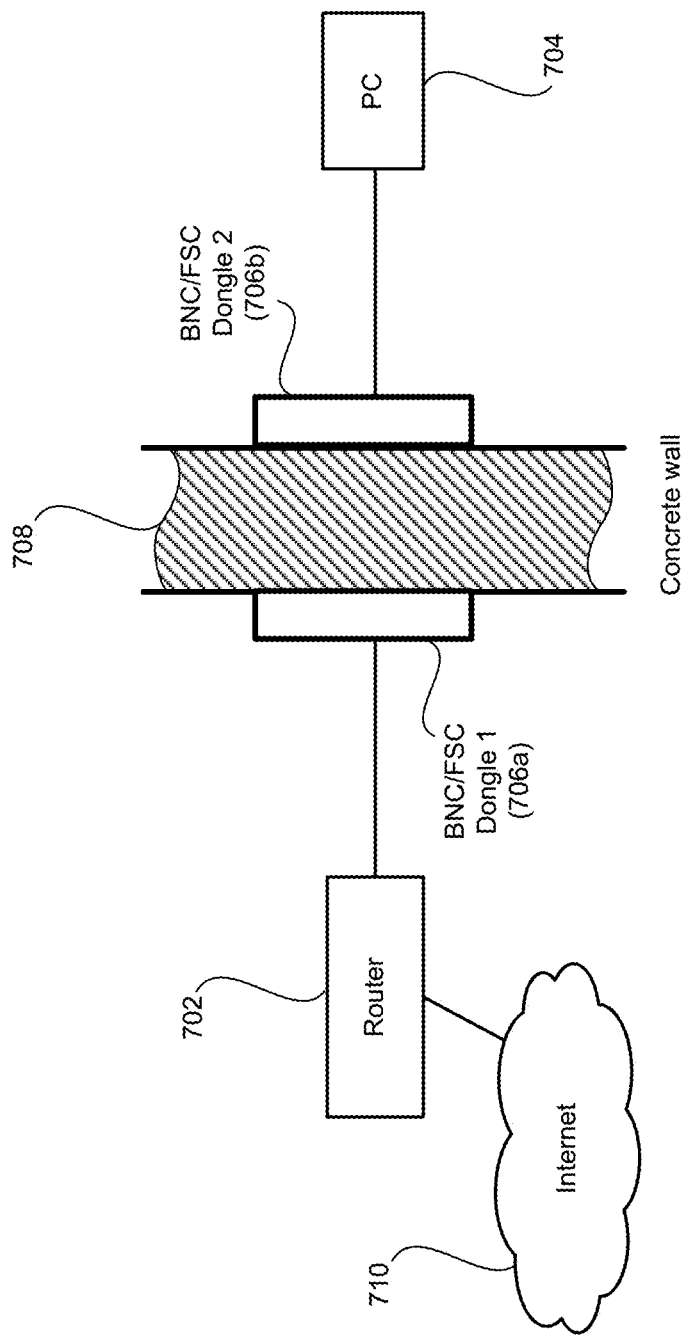
FIG. 7 is a block diagram that illustrates an example use of dongles, such as BNC/FSC dongles for example, in accordance with an example embodiment of the invention.

FIG. 7 is a block diagram that illustrates an example use of dongles, such as BNC/FSC dongles for example, in accordance with an example embodiment of the invention. Referring to FIG. 7, there is shown a router 702, a PC 704, two BNC/FSC dongles, namely dongle 1 (706a) and dongle 2 (706b), a dwelling wall 708 and the Internet 710.

The BNC/FSC dongle 1 (706a) may be communicatively coupled to a port such as an Ethernet port or MoCA port of the router 702. The router 702 may be coupled to the Internet 710. The BNC/FSC dongle 2 (706b) is communicatively coupled to, for example, an Ethernet port or MoCA port of the PC 704. The BNC/FSC dongle 1 (706a) is placed adjacent to the BNC/FSC dongle 2 (706b) on an opposite side of the dwelling wall 708. There is no wired connection existing through the wall between the BNC/FSC dongle 1 (706a) and the BNC/FSC dongle 2 (706b). The BNC/FSC dongle 1 (706a) may be referred to as a first broadband wireless device and the BNC/FSC dongle 2 (706b) may be referred to as a second broadband wireless device.

The router 702 may comprise suitable logic circuitry interfaces and/or code that may be operable to route signals from one or more ingress ports to one or more egress ports. For example, the router 702 may be operable to route signals received from the BNC/FSC dongle 1 (706a) to the Internet 710 and to route signals received from the Internet 710 to the BNC/FSC dongle 1 (706a). The router 702 may comprise a wireless and/or wired interface. The wireless interface may comprise a Wireless LAN (802.11 a, b, g, e, n), Bluetooth or other interface. The wired interface may comprise a MoCA, Ethernet or other interface. In one example embodiment of the invention, the connection between the router 702 and the BNC/FSC dongle 1 (706a) may utilize the wireless interface such as 802.11 a, b, g, e, n. In another example embodiment of the invention, the connection between the router 702 and the BNC/FSC dongle 1 (706a) may utilize the wired interface such as Ethernet.

The PC 704 may comprise suitable logic circuitry interfaces and/or code that may be operable to provide personal computing and communication services. For example, the PC 704 may be utilized to surf the Internet, which may be accessible via the router 702 and a BNC/FSC connection between the BNC/FSC dongle 1 (706a) and the BNC/FSC dongle 2 (706b). The PC 704 may comprise a wired and/or wireless interface. The wireless interface may comprise a Wireless LAN (802.11 a, b, g, e, n), Bluetooth or other interface. The wired interface may comprise a MoCA, Ethernet or other interface. In one example embodiment of the invention, the connection between the PC 704 and the BNC/FSC dongle 2 (706b) may utilize the wireless interface such as 802.11 a, b, g, e, n. In another example embodiment of the invention, the connection between the PC 704 and the BNC/FSC dongle 2 (706b) may utilize the wired interface such as Ethernet.

The dwelling wall 708 may comprise a barrier or support structure for a building such as a home or office. The dwelling wall may be made of wood, concrete gypsum, composite, and/or other material that may be utilized for building walls.

Each of the two BNC/FSC dongles 706a, 706b may comprise suitable logic circuitry interfaces and/or code that may be operable to utilize broadband near-field communication with full spectrum capture (BNC/FSC) to communicate with each other across a barrier such as the dwelling wall 708. Each of the BNC/FSC dongles 706a, 709b may be substantially similar to the BNC/FSC dongle 260, which is illustrated in FIG. 2B. One or both of the two BNC/FSC dongles 706a, 706b may comprise an alignment/positioning module 269 that may be operable to provide alignment of the two BNC/FSC dongles 706a, 706b when they are affixed to a barrier such as the dwelling wall 708. Proper alignment of the two BNC/FSC dongles 706a, 706b ensures optimal communication between the two BNC/FSC dongles 706a, 706b.

In accordance with an example embodiment of the invention, the alignment/positioning module 269 within one or both of the BNC/FSC dongles 706a, 706b may comprise circuitry and code that may be operable to provide proper or optimal alignment of two BNC/FSC dongles 706a, 706b when they are placed on opposites sides of the barrier such as the dwelling wall 708. In this regard, test signals may be transmitted by one or both of the BNC/FSC dongles 706a, 706b and received in order to determine when the corresponding BNC/FSC dongle is aligned to provide optimal communication between the two BNC/FSC dongles 706a, 706b. LEDs, beeps, audio or other alerting or display mechanisms may be utilized to provide alignment cues and to indicate when the BNC/FSC dongle 1 (706a) is properly aligned with the BNC/FSC dongle 2 (706b). Visual alignment cues may be provided by the LED/LCD module 269b and audio alignment cues may be provided by the speaker 269c.

One method aligning the two paired dongles such as the BNC/FSC dongles 706a, 706b is to place one of the BNC/FSCs dongles in a fixed position and then move the other BNC/FSC dongle so as to achieve optimal alignment. A visual and/or audible alert may be generated to indicate when the optimal alignment occurs. One example visual alert may comprise a series of 5 LED lights arranged as a bar. Whenever all 5 LED lights are lit, this may indicate that optimal alignment is achieved and signals are being communicated between the two BNC/FSC dongles 706a, 706b in an efficient manner at maximum throughput. In instances when less than 5 LED lights are lit, then the alignment of the two dongles are less than optimal, and a better position exists for aligning both of the BNC/FSC dongles 706a, 706b. As an increasing number of LED lights are lit, and then this provides an indication that the two BNC/FSC dongles 706a, 706b are being moved towards a position that is approaching the optimal alignment position.

Another example visual alert may comprise a LED/LCD counter that may be operable to display a count of 1 to 10. Whenever the LED/LCD counter displays a value of 10, this may indicate that optimal alignment is achieved and signals are being communicated between the two BNC/FSC dongles 706a, 706b in an efficient manner at maximum throughput. In instances when the LED/LCD counter displays a value of less than 10, then the alignment of the two dongles are less than optimal, and a better position exists for aligning both of the BNC/FSC dongles 706a, 706b. As the count value on the LED/LCD counter increases, then this provides an indication that the two BNC/FSC dongles 706a, 706b are being moved towards a position that is approaching the optimal alignment position.

One example audio alert may comprise a series of beeps and a solid tone. Whenever a solid tone occurs, this may indicate that optimal alignment is achieved and signals are being communicated between the two BNC/FSC dongles 706a, 706b in an efficient manner at maximum throughput. In instances when beeps may occur a slow rate, then the alignment of the two dongles are less than optimal, and a better position exists for aligning both of the BNC/FSC dongles 706a, 706b. As an increasing number of beeps are generated, then this provides an indication that the two BNC/FSC dongles 706a, 706b are being moved towards a position that is approaching the optimal alignment position.

One example audio alert may comprise a voice command that specified the direction in which to move one of the BNC/FSC dongles in order to provide optimal alignment. For example, the voice command may indicate "move left," "move right," "move up," "move down," and "devices a now aligned."

In some instances, an integrated module may be used to provide wireless power and communication, such as based on broadband near-field communication (BNC) for example. Example embodiments of such integrated modules, and/or use thereof are described in more detail in U.S. application Ser. No. 13/726,965, entitled which is incorporated herein by reference, as set forth above.

Figure 8:
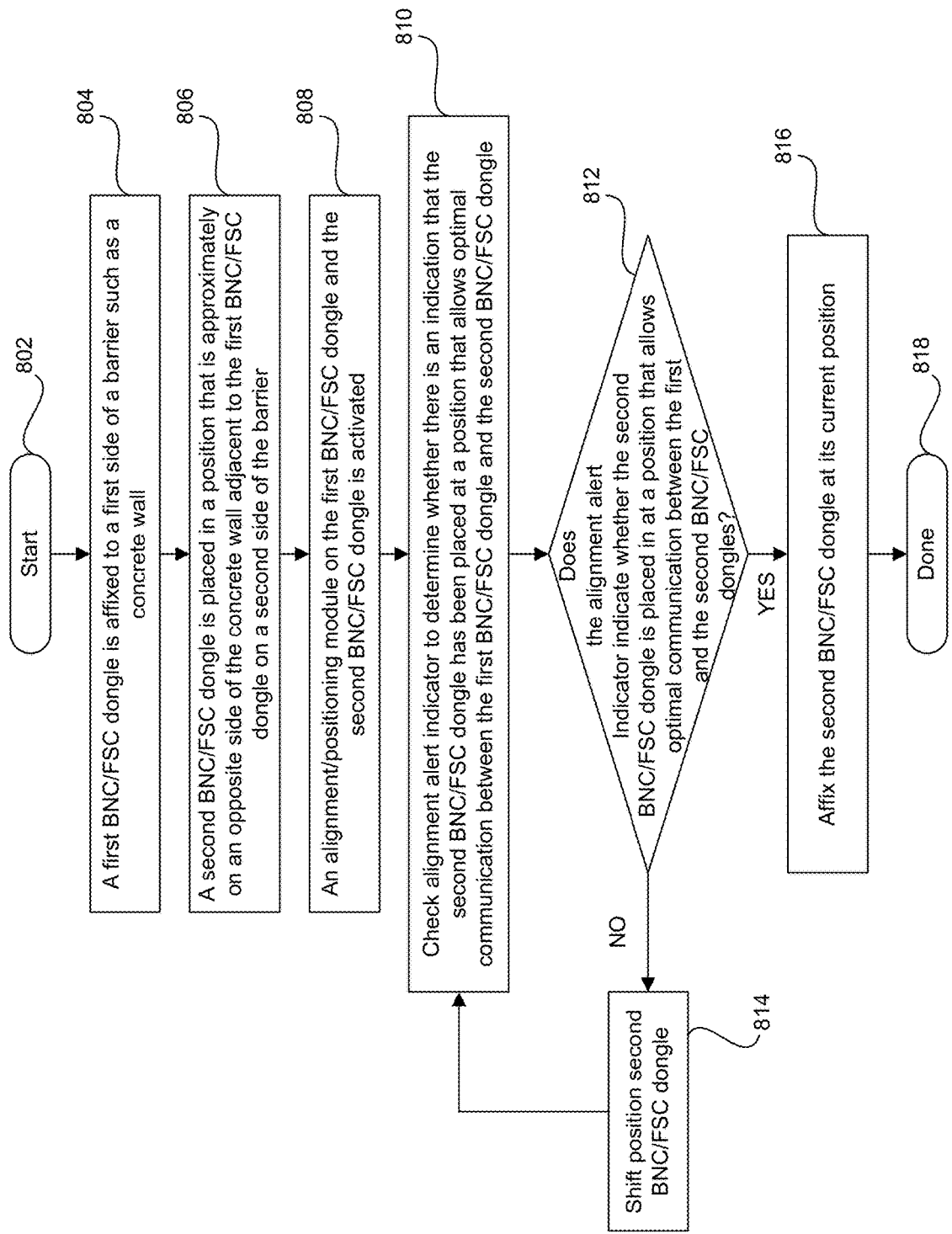
FIG. 8 is a flow chart that illustrates example steps for optimally installing two companion dongles, such as BNC/FSC dongles for example, in accordance with an example embodiment of the invention.

FIG. 8 is a flow chart that illustrates example steps for optimally installing two companion dongles, such as BNC/FSC dongles for example, in accordance with an example embodiment of the invention. Referring to FIG. 8, the example steps start at step 802.

In step 804, a first BNC/FSC dongle 706a is affixed to a first side of a barrier such as the dwelling wall 708. In step 806, a second BNC/FSC dongle 706b is placed in a position that is approximately on an opposite side of the concrete wall adjacent to the first BNC/FSC dongle 706a on a second side of the barrier. In step 808, an alignment/positioning module 269 on the first BNC/FSC dongle 706a and on the second BNC/FSC dongle 706b is activated. In step 810, an alignment alert indicator may be checked to determine whether there is an indication that the second BNC/FSC dongle 706b has been placed at a position that allows optimal communication between the first BNC/FSC dongle 706a and the second BNC/FSC dongle 706b.

In step 812, based on the alignment alert indicator, it may be determined, whether the second BNC/FSC dongle 706b is placed at a position that allows optimal communication between the second and the first BNC/FSC dongles 706b, 706a, respectively. If the alignment alert indicator indicates that the two BNC/FSC dongles 706a, 706b have not been placed in a position that allows optimal communication between the two BNC/FSC dongles 706a, 706b, then in step 814, the second BNC/FSC dongle 706b may be shifted to another position. In this regard, in some instances one of the BNC/FSC dongles 706a, 706b may communication signal or indicator to shift position and/or particular information on how to shift position (e.g., based on estimation of required change to allow optimal communication). Control then returns to step 810, where the alignment alert indicator may be checked to determine whether there is an indication that the second BNC/FSC dongle 706b has been placed at a position that allows optimal communication between the first BNC/FSC dongle 706a and the second BNC/FSC dongle 706b.

If the alignment alert indicator indicates that the two BNC/FSC dongles 706a, 706b have been placed in a position that allows optimal communication between the two BNC/FSC dongles 706a, 706b, then in step 816, the second BNC/FSC dongle 706b may be affixed at its current position to the barrier such as the dwelling wall 708. The example steps may end at step 818.

In accordance with an example embodiment of the invention, an application running on a Smartphone may be utilized to align the first BNC/FSC dongle 706a with the second BNC/FSC dongle 706b. In this regard, the first BNC/FSC dongle 706a and the second BNC/FSC dongle 706b may operable to wirelessly communicate with the Smartphone utilizing, for example, Bluetooth or WiFi. The Smartphone may be operable to receive alignment information from one or both of the first BNC/FSC dongle 706a and the second BNC/FSC dongle 706b update an audio and/or graphical user interface that may provide corresponding audio and/or visual cues for alignment.

Figure 9:
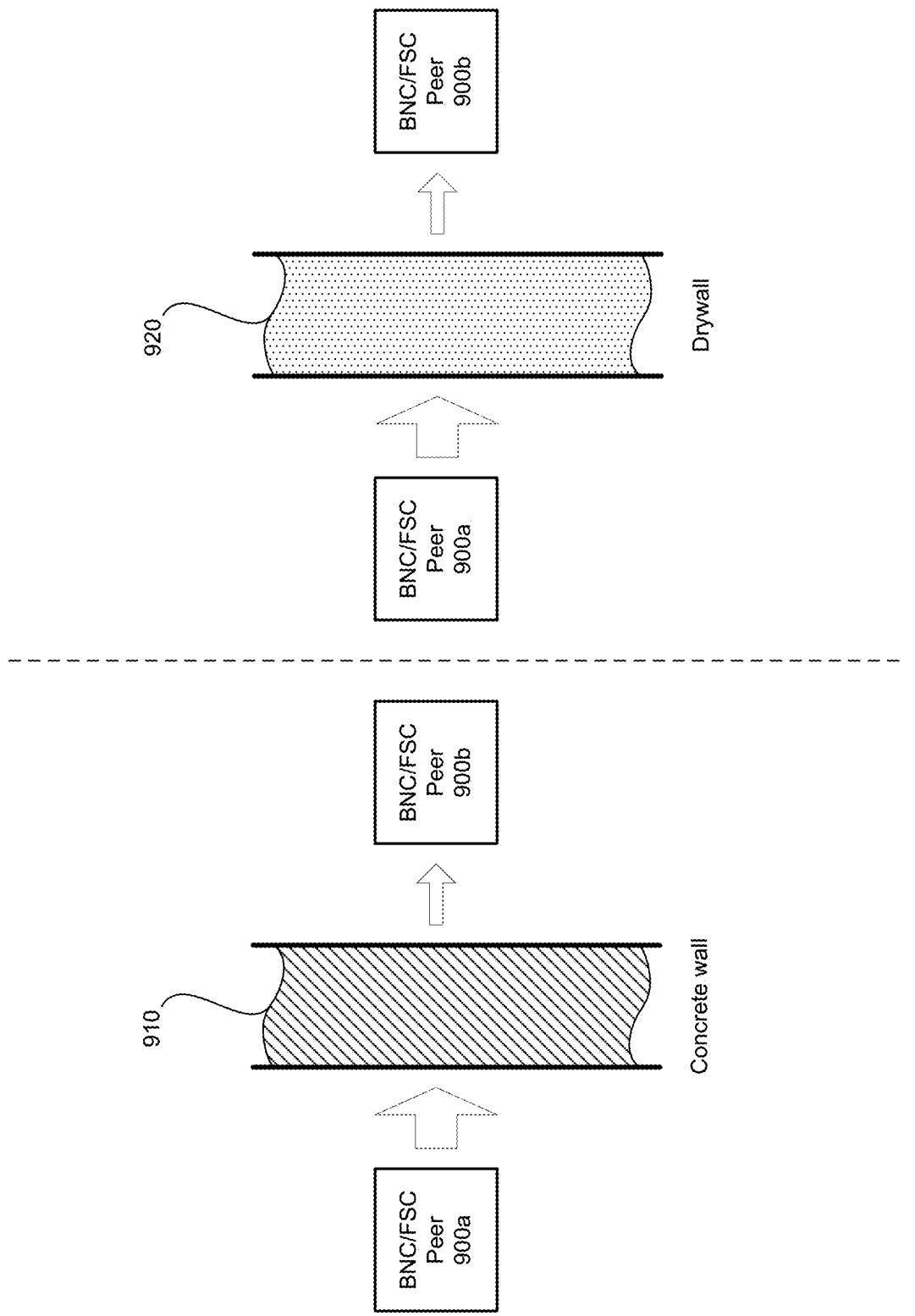
FIG. 9 is a block diagram that illustrates varying of attenuation of signals passing through different barriers, in accordance with an embodiment of the invention.

FIG. 9 is a block diagram that illustrates varying of attenuation of signals passing through different barriers, in accordance with an embodiment of the invention. Referring to FIG. 9 there is shown two BNC/FSC transceiver peers 900a and 900b.

Each of the two BNC/FSC transceiver peers 900a and 900b may comprise suitable logic circuitry interfaces and/or code for enabling and/or supporting broadband near-field communication (BNC) with full spectrum capture (FSC). In this regard, each of the BNC/FSC transceiver peers 900a and 900b may correspond to a BNC/FSC enabled device (e.g., the BNC/FSC enabled device 200) and/or a BNC/FSC dongle (e.g., the BNC/FSC dongle 300). In an example aspect of the invention, the two BNC/FSC transceiver peers 900a and 900b may be configured to communicate wirelessly, such as through physical barriers (e.g., dwelling walls). In this regard, the BNC/FSC transceiver peer 900a may be placed adjacent to the BNC/FSC transceiver peer 900b on an opposite side of a dwelling wall (e.g., the dwelling wall 708), without wired connection existing through the wall between peers, with these peers utilizing broadband wireless connectivity, such as using broadband near-field communication (BNC) with full spectrum capture (FSC). The BNC/FSC transceiver peer 900a may be referred to as a first broadband wireless device and the BNC/FSC transceiver peer 900b may be referred to as a second broadband wireless device.

In operation, the BNC/FSC transceiver peer 900a and 900b may be configured to communicate wirelessly across physical barriers, which may obviate the need to extend wired connections between the peers through the barriers (thus requiring making holes through the barriers). The wireless communication between the BNC/FSC transceiver peer 900a and 900b may be configured based on broadband near-field communication (BNC), and/or with full spectrum capture (FSC) as described with respect to, for example, FIGS. 1-8. Wireless communications across a physical barrier (e.g., a wall), however, may be affected by characteristics of the physical barriers. In this regard, characteristics that may affect wireless communication through barriers may comprise the type of material used for the barrier (e.g., wood, concrete gypsum, composite, and/or other material that may be utilized for building walls), the thickness of the barrier, presence of particular material that may affect wireless communications (e.g., iron rods), or the like. Accordingly, transmitting the same wireless signals by transmitting-end peers across different barriers may result in different received signals by receiving-end peers. For example, because it may be easier for signals to propagate through a drywall 920 than through a concrete wall 910, transmitting similar signals by the BNC/FSC transceiver peer 900*a* (e.g., a BNC based 500 Mbps signals) may be attenuated differently as a result of travelling through the drywall 920 instead of through the concrete wall 910 (e.g., 10 dB vs. 1 dB), thus resulting in stronger signals being received by the BNC/FSC transceiver peer 900*b* in the case of drywall 920.

Accordingly, in various implementations of the present invention, wireless communication between BNC/FSC transceiver devices (e.g., the BNC/FSC transceiver peers 900*a* and 900*b*) may be performed using wireless signal transmission and/or reception components (e.g., incorporating antennas and the like) which may be adaptively configured and/or optimized based on the particular physical barriers that separate these peers. In this regard, such wireless signal transmission and/or reception components may be configured to ensure that they may transmit (and receive) signals that would be able to propagate across the physical barriers while achieving particular performance criteria, and such configuration may be adapted (e.g., modified) based on variations in characteristics of the physical barriers and/or the desired performance criteria. For example, in an embodiment of the invention, the BNC/FSC transceiver peers 900*a* and 900*b* may be placed on either side of a wall to act as a wireless bridge for a network, and an particular alert mechanism (e.g., an audio (beep) and/or visual (varying intensity LED/light) alert mechanism) may be utilized to indicate optimal placement of the BNC/FSC transceiver devices to maximize communication. The BNC/FSC transceiver peers 900*a* and 900*b* may then be configured, after a determination that they are separated by a concrete wall (910) that may be around 2 ft in thickness, such that they may enable wireless communication through concrete walls up to or greater than 2 feet in thickness, and providing (performance wise) speeds of a 1 Gbps or more at 1 GHz.

In some instances, and to further enhance the BNC based wireless communication, the wireless signal transmission and/or reception components may also be configured to, in addition to being adaptively optimized for wireless near-field communication (particularly across a physical barrier of particular characteristics), nullify or minimize signal communication in other areas (e.g., within intermediate or far-field ranges). For example, particularly selected and/or configured antennas (e.g., dipole antennas) and/or coils may be used to provide optimal signal communication in regions laying directly between the BNC/FSC transceiver devices (including across any physical barriers), which may correspond to near-field ranges, while nullifying or at least limiting signals in other regions, which may correspond to far-field or intermediate-field ranges. In some instances, the antennas (or similar components) of BNC/FSC transceiver devices may be configured such that the near field stored energy near the antennas (including, for example, the region between the antennas of the BNC/FSC transceiver devices) is designed to be large in relation to the radiated energy, to further optimize communication in the near field range (particularly between the devices) while minimizing communication elsewhere. Example embodiments that utilize such antennas or coils are described in more detail with respect to FIGS. 10A and 10B.

Figure 10A:
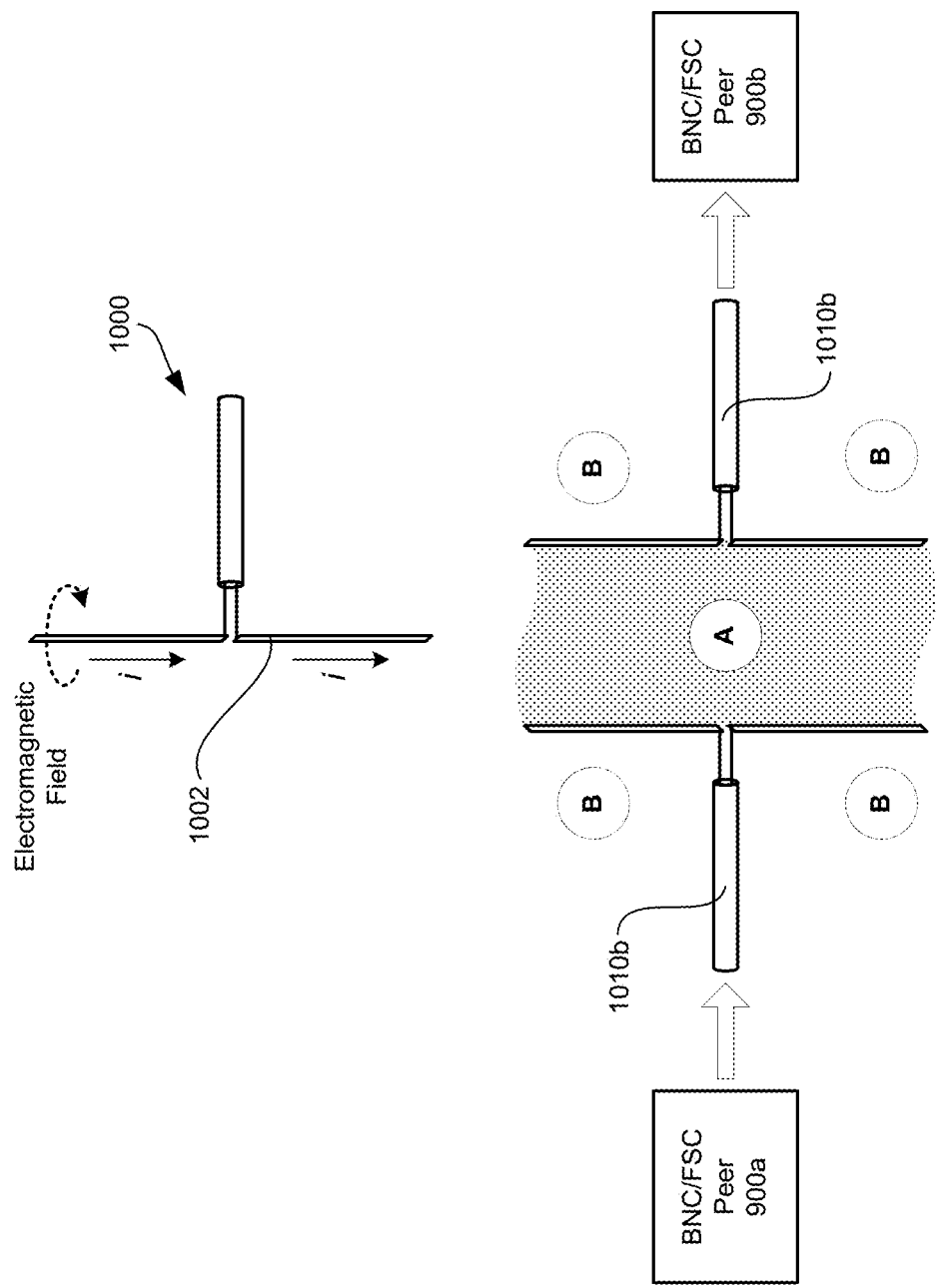
FIG. 10A is a block diagram that illustrates use of dipole antennas that are configured to provide optimized near-field-communication (NFC) while reducing the effect of far-field-communication (FFC) for broadband near-field communication (BNC), in accordance with an embodiment of the invention.

FIG. 10A is a block diagram that illustrates use of dipole antennas that are configured to provide optimized near-field-communication (NFC) while reducing the effect of far-field-communication (FFC) for broadband near-field communication (BNC), in accordance with an embodiment of the invention. Referring to FIG. 10A, there is a shown a wireless signal emitter/receiver component 1000.

The wireless signal emitter/receiver component 1000 may comprise suitable logic, circuitry, interfaces and/or code for communicating (transmitting and/or receiving) signals wirelessly in a manner that supports broadband near-field communication (BNC) with full spectrum capture (FSC). In particular the wireless signal emitter/receiver component 1000 may be adapted and/or configured for optimizing near-field-communication (NFC) operations while reducing the effect of far-field-communication (FFC). As shown in FIG. 10A, the wireless signal emitter/receiver component 1000 may be implemented utilizing dipole antennas. For example, the wireless signal emitter/receiver component 1000 may comprise a dipole antenna 1002, which may be utilized to communicate signals wirelessly. In this regard, when used in transmitting signals (wirelessly), the dipole antenna 1002 may be operable to create an electromagnetic field as a result of passing of electrical current i in the dipole antenna 1002. When receiving signals (wirelessly), currents may be created through the dipole antenna 1002 as a result of being subjected to an electromagnetic field (e.g. of another dipole antenna within operational proximity of the dipole antenna 1002). Accordingly, a signal communication profile of the dipole antenna 1002 may be dictated by the electromagnetic field(s) generate by or applied to the dipole antenna 1002.

In an example embodiment, BNC/FSC transceiver devices (e.g., the BNC/FSC transceiver peers 900*a* and 900*b* may utilize dipole antenna based wireless signal emitter/receiver components to achieve optimal NFC performance while nullifying other signal communications (e.g., FFC or intermediate range communications). For example, the BNC/FSC transceiver peers 900*a* and 900*b* may incorporate and/or be coupled to wireless signal emitter/receiver components 1010*a* and 1010*b*, respectively (each of which may be substantially similar to the wireless signal emitter/receiver component 1000). In this regard, the wireless signal emitter/receiver components 1010*a* and 1010*b* may be placed and/or positioned next to each other (e.g., across a physical barrier, such as the concrete wall 910 or the drywall 920), such that their dipole antennas may be positioned next to (or near) each other, as shown in FIG. 10A. The placing and/or positioning of the wireless signal emitter/receiver components 1010*a* and 1010*b* (and/or configuring of operations thereof) may be done such that the electromagnetic field between the dipole antennas may be enhanced in the region between the two dipole antennas (shown as region A) and nulled in regions that are not between the dipole antennas (shown as regions B). For example, the components 1010*a* and 1010*b* may be placed or configured such that the electromagnetic fields between the two dipole antennas may reinforce each other to create a near field effect (in region A), while concurrently resulting in cancellation (or substantial reduction) of the electromagnetic fields in the other regions (in regions B), which may correspond to far-field or even intermediate-field ranges.

Figure 10B:
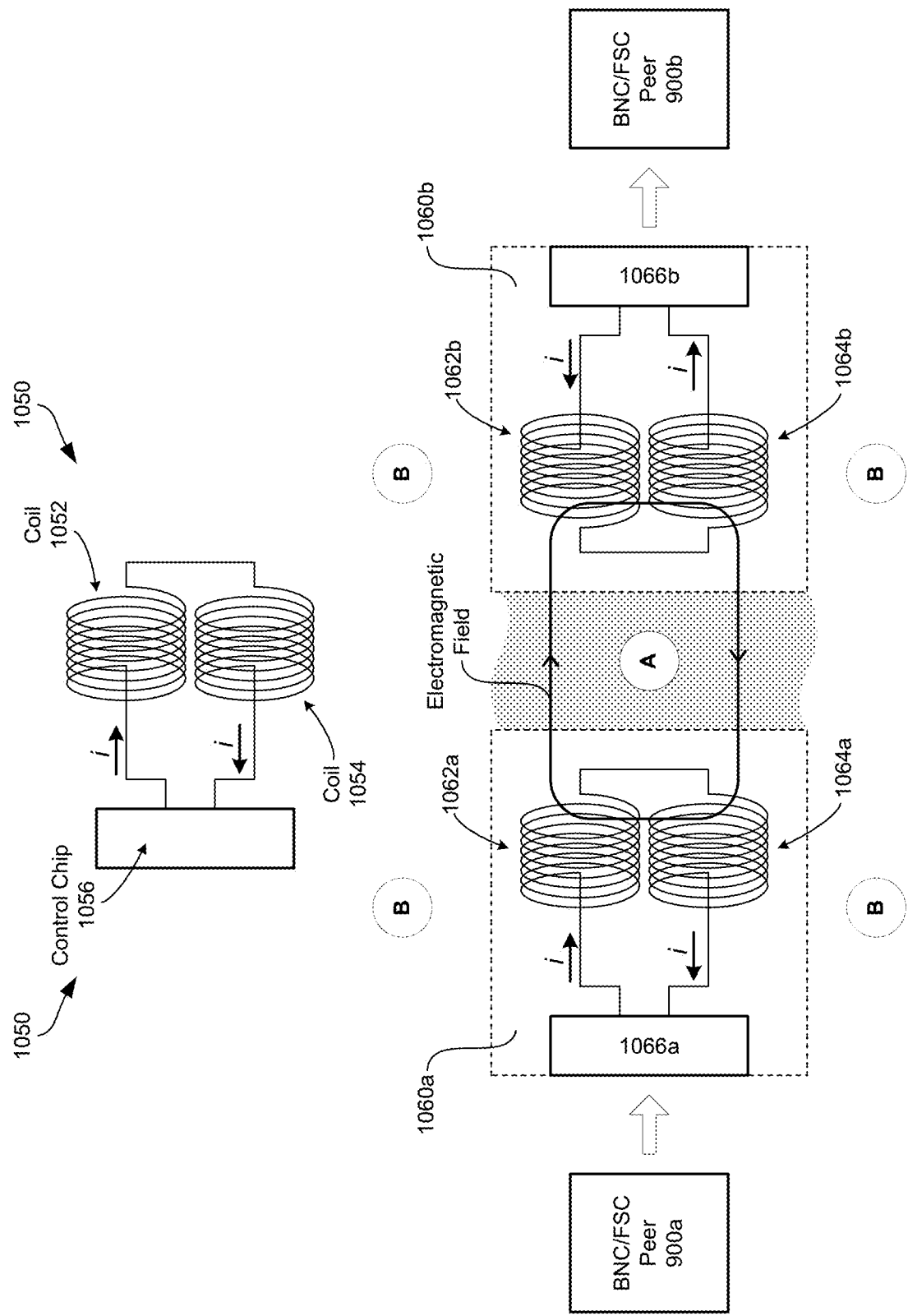
FIG. 10B is a block diagram that illustrates use of coil based antennas configured to provide optimized near-field-communication (NFC) while reducing the effect of far-field-communication (FFC) for broadband near-field communication (BNC), in accordance with an embodiment of the invention.

FIG. 10B is a block diagram that illustrates use of coil based antennas configured to provide optimized near-field-communication (NFC) while reducing the effect of far-fieldcommunication (FFC) for broadband near-field communication (BNC), in accordance with an embodiment of the invention. Referring to FIG. 10B, there is a shown a wireless signal emitter/receiver component 1050.

The wireless signal emitter/receiver component 1050 may comprise suitable logic, circuitry, interfaces and/or code for communicating (transmitting and/or receiving) signals wirelessly in a manner that supports broadband near-field communication (BNC) with full spectrum capture (FSC). In particular the wireless signal emitter/receiver component 1050 may be adapted and/or configured for optimized near-field-communication (NFC) operations while reducing the effect of far-field-communication (FFC). As shown in FIG. 10B, the wireless signal emitter/receiver component 1050 may be implemented based on use of coils. In this regard, the wireless signal emitter/receiver component 1050 may comprise a pair of coils 1052 and 1054, which may be communicatively coupled to a broadband near-field communication chip 1056, which may be operable to control use of the coils 1052 and 1054 (in communicating signals).

For example, the coils 1052 and 1054 may serve as antenna coils, whereby signals may be communicated (wirelessly) to and/or from the wireless signal emitter/receiver component 1050 based on configuration and/or adjusting of electromagnetic fields as result of passing of inputs (e.g., electrical currents) through the coils 1052 and 1054. In this regard, one or more inputs can be utilized to drive the coils 1052 and 1054. In a single input implementation, the coils 1052 and 1054 may comprise (or be connected as) a single wire, thus allowing use of a single input (e.g., a single electrical current i). The input(s) (e.g., electrical current(s)) passing through the coils 1052 and 1054 may be generated and/or controlled by the chip 1056.

In some instances, different implementations may be combined for enhanced performance. For example, in an example embodiment, coils (similar to the coils 1052 and 1054) may be combined with dipole antenna (e.g., the antenna 1002) to enhance the effect of the electromagnetic fields in a desired manner. In this regard, the coils may be placed and/or setup in a manner that may result in and/or ensure optimization of near-field effects between the dipole antenna(s) and/or to cancel the far-field (or intermediate-field) effects outside the region between the dipole antennas. Such implementation may enable increasing power substantially so that the far-field effects may still remain within particular criteria (e.g., remain within permissible FCC limits at acceptable distances).

In an example embodiment, BNC/FSC transceiver devices (e.g., the BNC/FSC transceiver peers 900a and 900b may utilize coil based wireless signal emitter/receiver components to achieve optimal NFC performance while nullifying other signal communications (e.g., FFC and/or intermediate range communications). For example, the BNC/FSC transceiver peers 900a and 900b may incorporate and/or be coupled to wireless signal emitter/receiver components 1060a and 1060b, respectively (each of which may be substantially similar to the wireless signal emitter/receiver component 1050). In this regard, the wireless signal emitter/receiver components 1060a and 1060b may be placed and/or positioned near each other (e.g., across a physical barrier, such as the concrete wall 910 or the drywall 920). For example, the wireless signal emitter/receiver components 1060a and 1060b may be placed and/or positioned such that the components' broadband near-field communication chips 1066a and 1066b are placed on the opposite surfaces of the physical barrier, with the components' coils (1062a and 1064a, and 1062b and 1064b) extending away from and perpendicular to the opposite surfaces of the physical barrier. The placing and/or positioning of the wireless signal emitter/receiver components 1060a and 1060b (and/or configuring of operations thereof) may be done such that the electromagnetic field between the components 1060a and 1060b may be enhanced in the region between the two dipole chips (shown as region A), which may extend across the physical barrier, and is nulled in other regions (shown as regions B). In this regard, the components 1060a and 1060b may be placed or configured such that the electromagnetic fields corresponding to flow of electrical currents in the coils (1062a, 1064a, 1062b and 1064b) may reinforce each other between the chips (i.e. in region A) to create a near field effect therein, while resulting in cancellation (or substantial reduction) of the electromagnetic fields in the other regions (in regions B), which may correspond to far-field or even intermediate-field ranges.

Figure 11:
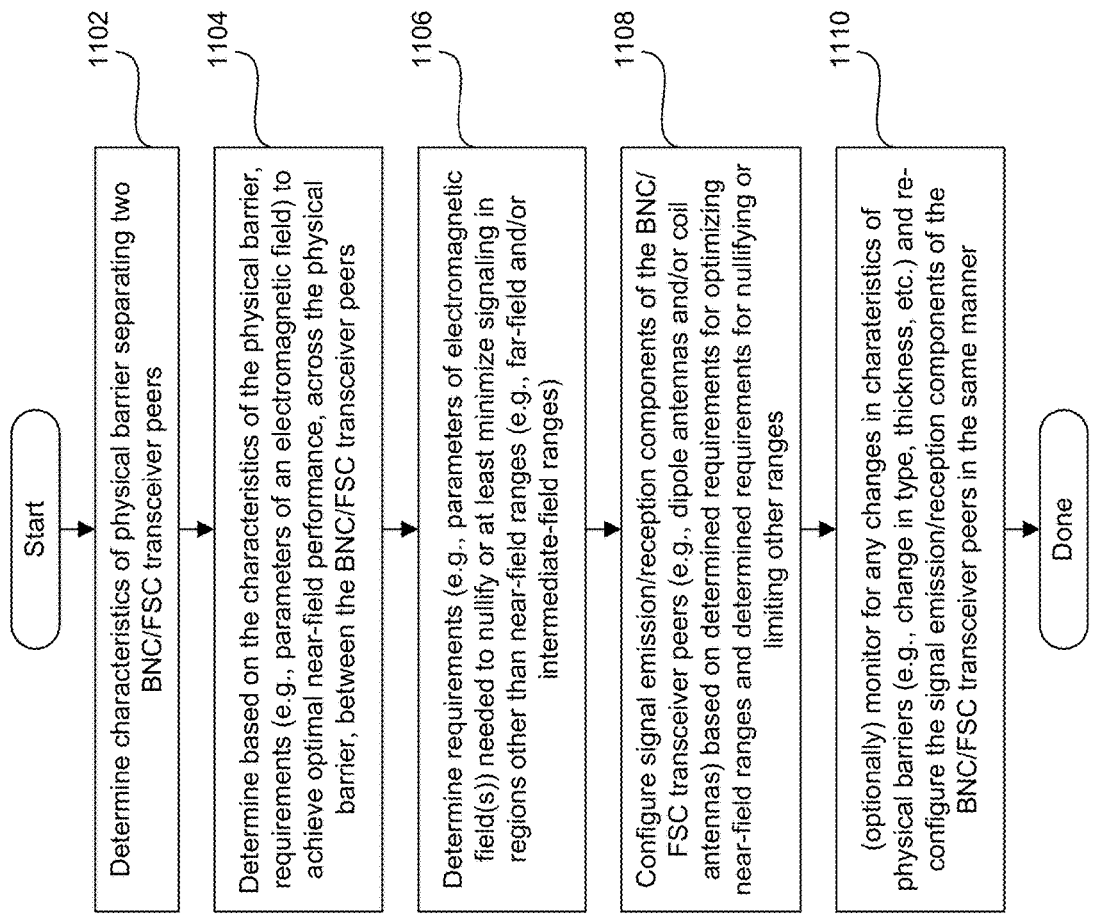
FIG. 11 is a flow chart that illustrates example steps for configuring and utilizing signal emitter/reception components that optimize near-field-communication (NFC) while reducing effect of far-field-communication (FFC), in accordance with an example embodiment of the invention.

FIG. 11 is a flow chart that illustrates example steps for configuring and utilizing signal emitter/reception components that optimize near-field-communication (NFC) while reducing effect of far-field-communication (FFC), in accordance with an example embodiment of the invention. Referring to FIG. 11, after a start step, in step 1102 characteristics of a physical barrier separating two BNC/FSC transceiver peers may be determined. In this regard, physical barrier characteristics may comprise type (e.g., drywall, concrete, etc.), thickness, and the like. In step 1104, it may be determined, based on the characteristics of the physical barrier, signal communication requirements needed to achieve optimal near-field performance, across the physical barrier, between the BNC/FSC transceiver peers. The requirements of the signal communication may dictate, for example, the electromagnetic fields that would have been utilized between the peers to achieved the desired signal communication profile. In step 1106, requirements (e.g., parameters of electromagnetic field(s)) needed to null (or at least minimize) signaling in regions other than the region(s) corresponding to near-field ranges (e.g., far-field and/or intermediate-field ranges) may be determined. In step 1108, signal emission/reception components of the BNC/FSC transceiver peers may be jointly configured based on determined requirements for optimizing near-field ranges and determined requirements for nullifying or limiting other ranges (e.g., FFC ranges). The signal emission/reception components may comprise dipole antennas and/or coil antennas, with the joint configuring comprising selecting characteristics of the antennas or coils, and/or configuring the electrical currents passing therein (which in turn dictate the electromagnetic fields generated (or driving) the antennas or coils. In step 1110, it may be determined whether there has been any changes in characteristics of physical barriers (e.g., change in type, thickness, etc.), and the signal emission/reception components of the BNC/FSC transceiver peers may be reconfigured in the same manner (i.e. based on determined requirements for optimizing NFC based signaling while nullifying (or substantially reducing) signaling in other ranges (e.g., in FFC or intermediate-field ranges).

Although this disclosure makes various references to BNC and near-field communications in general, in some implementations communications described above as using near-field communications may also or alternatively use transition zone (distances between near field and far field) communications and/or far-field communications. Accordingly, aspects of the present invention, including various devices, protocols, and systems described herein using "BNC" or "near-field" modifiers, should be considered as disclosing corresponding transition zone and fair-field devices, protocols, and systems. Therefore, a claim term should not be construed as being necessarily limited by the terms "BNC" or "near-field" unless such modifiers are explicitly recited in the claim with respect to such claim term.

Another example embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a method and system for providing an antenna that is optimized for near-field-communication (NFC) and reduces the effect of far-field-communication (FFC).

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain example embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system, comprising:
one or more communication circuits;
one or more alignment circuits; and
a signal transmission component
wherein:
the one or more communication circuits:
pair the system with a peer system, wherein the system and the peer system are on opposite sides of a barrier; and
configure wireless communication of signals between the system and the peer system to nullify or reduce signals in areas other than a region within the barrier between the signal transmission component and a signal reception component of the peer system; and
the one or more alignment circuits enable aligning the system with the peer system, wherein the aligning comprises providing feedback to enable the aligning of the system with the peer system.

2. The system of claim 1, wherein the one or more communication circuits configure the pairing using one or more broadband near-field communication (BNC) protocols.

3. The system of claim 1, wherein the signal transmission component comprises one or more antennas or coils.

4. The system of claim 1, wherein the one or more communication circuits configure the signal transmission component to nullify or reduce the signals in the areas other than the region within the barrier.

5. The system of claim 1, wherein the one or more communication circuits configure the signal transmission component to:
optimize electromagnetic field in the region within the barrier; and
nullify electromagnetic field in other regions.

6. The system of claim 5, wherein the one or more communication circuits configure the optimization of the electromagnetic field to reinforce an electronic field associated with the signal reception component of the peer system to create a near field effect.

7. The system of claim 5, wherein the one or more communication circuits configure the signal transmission component to make near field stored energy larger in relation to radiated energy.

8. The system of claim 1, wherein the one or more alignment circuits generate alignment related signals to enable the aligning of the system with the peer system.

9. The system of claim 8, wherein the alignment related signals comprises test signals, preambles and pilot tones.

10. The system of claim 1, wherein the one or more alignment circuits generate signal quality indicators to enable the aligning of the system with the peer system.

11. The system of claim 10, wherein the one or more signal quality indicators comprises error rates, signal to noise ratio, signal to interference plus noise ratio, carrier to noise ratio, carrier to interference noise ratio, error vector magnitude, and signal strength indicator.

12. The system of claim 1, wherein the one or more alignment circuits generate visual and/or audio cues to enable the aligning of the system with the peer system.

13. The system of claim 1, wherein the one or more communication circuits:
detect usable channels within a frequency spectrum band designated for use by the system and the peer system; and
configure the wireless communication of the signals to utilize one or more of the detected usable channels.

14. The system of claim 13, wherein the one or more communication circuits:
aggregate a plurality of the detected usable channels; and
configure the wireless communication of the signals to utilize at least a portion of the aggregated plurality of the detected usable channels.

15. A method, comprising:
pairing a first electronic device with a second electronic device, wherein the first electronic device and the second electronic device are on opposite sides of a barrier;
configuring wireless communication of signals between the first electronic device and the second electronic device to nullify or reduce signals in areas other than a region within the barrier between a signal transmission component of the first electronic device and a signal reception component of the second electronic device; and providing feedback to enable aligning the first electronic device with the second electronic device.

16. The method of claim 15, comprising pairing the first electronic device with the second electronic device using one or more broadband near-field communication (BNC) protocols.

17. The method of claim 15, wherein each of the signal transmission component of the first electronic device and the signal reception component of the second electronic device comprise one or more antennas or coils.

18. The method of claim 15, comprising configuring one or both of the signal transmission component of the first electronic device and the signal reception component of the second electronic device to nullify or reduce the signals in the areas other than the region within the barrier.

19. The method of claim 18, wherein configuring one or both of the signal transmission component of the first electronic device and the signal reception component of the second electronic device comprises:
  optimizing electromagnetic field in the region; and
  nullifying electromagnetic field in other regions.

20. The method of claim 19, comprising configuring or applying optimization of electromagnetic fields of each of the signal transmission component of the first electronic device and the signal reception component of the second electronic device to reinforce each other to create a near field effect.

21. The method of claim 19, comprising configuring one or both of the signal transmission component of the first electronic device and the signal reception component of the second electronic device to make near field stored energy larger in relation to radiated energy.

22. The method of claim 15, wherein providing the feedback comprises generating alignment related signals to enable the aligning of the first electronic device with the second electronic device.

23. The method of claim 22, wherein the alignment related signals comprises test signals, preambles and pilot tones.

24. The method of claim 15, wherein providing the feedback comprises generating signal quality indicators to enable the aligning of the first electronic device with the second electronic device.

25. The method of claim 24, wherein the one or more signal quality indicators comprises error rates, signal to noise ratio, signal to interference plus noise ratio, carrier to noise ratio, carrier to interference noise ratio, error vector magnitude, and signal strength indicator.

26. The method of claim 15, wherein providing the feedback comprises generating visual and/or audio cues to enable the aligning of the first electronic device with the second electronic device.

27. The method of claim 15, comprising detecting usable channels within a frequency spectrum band designated for use by the first electronic device and the second electronic device, wherein the wireless communication of the signals of the signals utilizes one or more of the detected usable channels.

28. The method of claim 27, comprising aggregating a plurality of the detected usable channels, wherein the wirelessly communicating of the signals utilizes at least a portion of the aggregated plurality of the detected usable channels.

* * * * *